(12) United States Patent
Kitamura

(10) Patent No.: US 8,422,677 B2
(45) Date of Patent: Apr. 16, 2013

(54) STORAGE VIRTUALIZATION APPARATUS COMPRISING ENCRYPTION FUNCTIONS

(75) Inventor: Manabu Kitamura, Kawasaki (JP)

(73) Assignee: Hitachi, Ltd, Tokyo (JP)

( * ) Notice: Subject to any disclaimer, the term of this patent is extended or adjusted under 35 U.S.C. 154(b) by 1472 days.

(21) Appl. No.: 11/968,690

(22) Filed: Jan. 3, 2008

(65) Prior Publication Data

US 2008/0240434 A1 Oct. 2, 2008

(30) Foreign Application Priority Data

Mar. 29, 2007 (JP) ................................ 2007-087531

(51) Int. Cl.
*H04K 1/00* (2006.01)
*G06F 17/30* (2006.01)
*G06F 7/00* (2006.01)
*G06F 12/00* (2006.01)

(52) U.S. Cl.
USPC ............................ 380/255; 707/810; 707/831

(58) Field of Classification Search ........................ None
See application file for complete search history.

(56) References Cited

U.S. PATENT DOCUMENTS

| | | | | |
|---|---|---|---|---|
| 5,224,166 A | * | 6/1993 | Hartman, Jr. ................. | 713/190 |
| 6,889,329 B1 | * | 5/2005 | DiGiorgio et al. ................ | 726/9 |
| 7,240,197 B1 | | 7/2007 | Yamagami et al. | |
| 7,810,133 B2 | * | 10/2010 | Carter et al. ...................... | 726/2 |
| 7,840,750 B2 | * | 11/2010 | Baek et al. ..................... | 711/112 |
| 2002/0095557 A1 | * | 7/2002 | Constable et al. ............ | 711/163 |
| 2003/0061499 A1 | * | 3/2003 | Durrant ......................... | 713/189 |
| 2003/0120676 A1 | * | 6/2003 | Holavanahalli et al. ....... | 707/102 |
| 2003/0204597 A1 | | 10/2003 | Arakawa et al. | |
| 2005/0018844 A1 | | 1/2005 | Hayashi | |
| 2005/0114619 A1 | * | 5/2005 | Matsuo et al. ................ | 711/170 |
| 2005/0220305 A1 | | 10/2005 | Fujimoto et al. | |
| 2006/0182281 A1 | * | 8/2006 | Taguchi et al. ............... | 380/270 |
| 2006/0242363 A1 | * | 10/2006 | Tamura et al. ................ | 711/117 |
| 2006/0259949 A1 | * | 11/2006 | Schaefer et al. .................. | 726/1 |
| 2007/0101083 A1 | * | 5/2007 | Ogihara et al. ............... | 711/165 |

FOREIGN PATENT DOCUMENTS

| | | |
|---|---|---|
| EP | 1603044 A1 | 12/2005 |
| JP | 2002312223 | 10/2002 |
| JP | 2003316522 | 11/2003 |
| JP | 2004259262 | 9/2004 |
| JP | 2005026970 | 1/2005 |
| JP | 2005-107645 | 4/2005 |
| JP | 2005-322201 | 11/2005 |

* cited by examiner

*Primary Examiner* — Azizul Choudhury
(74) *Attorney, Agent, or Firm* — Bundidge & Stanger, P.C.

(57) ABSTRACT

A storage virtualization apparatus comprises a judgment portion. The judgment portion judges whether encryption functions are present in an external storage subsystem having an external logical volume identified based on a write request received from a higher-level device. When the result of the judgment is negative, the storage virtualization apparatus uses its own encryption functions to encrypt the data of the write request before transmission to the external storage subsystem, but when the result of the judgment is positive, the storage virtualization apparatus transmits the data of the write request as-is to the external storage subsystem, without using its own encryption functions to perform encryption.

7 Claims, 19 Drawing Sheets

FIG. 4

RAID CONFIGURATION TABLE

| VDEV (401) | DISK (402) | RAID LEVEL (403) | STRIPE SIZE (404) |
|---|---|---|---|
| 0 | 1, 2, 3, 4 | 5 | 32KB |
| 1 | 5, 6, 7, 8 | 5 | 32KB |
| ⋮ | ⋮ | ⋮ | ⋮ |
| k | m, m+1 | 5 | 32KB |

VDEV CONFIGURATION TABLE

| VDEV (501) | LDEV (502) | START (503) | END (504) |
|---|---|---|---|
| 0 | 0 | 0 | 0x77FFFFF |
| 0 | 1 | 0x7800000 | 0xC7FFFFF |
| ⋮ | ⋮ | ⋮ | ⋮ |
| 1 | 11 | 0 | 0x77FFFFF |
| 1 | 12 | 0x7800000 | 0xEFFFFFF |
| 1 | 13 | 0xF000000 | 0x13FFFFFF |
| ⋮ | ⋮ | ⋮ | ⋮ |

LU CONFIGURATION TABLE

| LDEV | WWN | LUN | CAPACITY | KEY |
|---|---|---|---|---|
| 0 | 31:02:c2:60:35:01 | 0 | 0x0057300 | 0x1234567812345678 |
| 1 | 31:02:c2:60:35:01 | 1 | 0x01BBC000 | 0xabcdefabcdefabcd |
| | 31:02:c2:26:44:04 | 2 | | |
| ⋮ | | ⋮ | ⋮ | |
| k | 31:02:c2:26:44:04 | n | 0x1ADB0000 | 0x9876543210987654 |

PORT CONFIGURATION TABLE

| PORT | STATUS |
|---|---|
| 31:02:c2:60:35:01 | TARGET |
| 31:02:c2:60:35:02 | EXTERNAL |

EXTERNAL VOLUME INFORMATION TABLE

| EDEV (251) | WWN (252) | LUN (253) | LDEV (254) | CIPHER (255) |
|---|---|---|---|---|
| 0 | 10:04:e2:04:48:39 | 0 | 300 | 0 |
| 1 | 10:04:e2:04:48:39 | 1 | 301 | 1 |
| ⋮ | ⋮ | ⋮ | ⋮ | ⋮ |

EXTERNAL VOLUME INFORMATION TABLE
( 2nd EMBODIMENT )

| EDEV (251) | WWN (252) | LUN (253) | LDEV (254) | CIPHER (255) | FLAG (256) |
|---|---|---|---|---|---|
| 0 | 10:04:e2:04:48:39 | 0 | 300 | 0 | 0 |
| 1 | 10:04:e2:04:48:39 | 1 | 301 | 1 | 1 |
| ⋮ | ⋮ | ⋮ | ⋮ | ⋮ | |

250'

STORAGE VIRTUALIZATION APPARATUS COMPRISING ENCRYPTION FUNCTIONS

CROSS-REFERENCE TO PRIOR APPLICATIONS

This application relates to and claims the benefit of priority from Japanese Patent Application No. 2007-87531, filed on Mar. 29, 2007, the entire disclosure of which is incorporated herein by reference.

BACKGROUND

This invention relates to encryption of data stored in a storage subsystem.

For example, in companies or other organizations, a storage subsystem, configured separately from a host computer (hereafter "host"), is used to manage large amounts of data. Such a storage subsystem incorporates for example numerous hard disk drives (HDDs) or other storage devices and a controller, and by means of the controller provides large amounts of storage to the host.

Various important information, such as for example the names and addresses of individuals or other private information, or information relating to trust or reliability, is stored in storage subsystems. Hence technology is required to manage important information in secrecy, and to prevent illicit access and similar.

In order to protect data, encryption technology may be used. As one of the method, Data is encrypted within the host, and this encrypted data is transmitted to the storage subsystem and stored, so that illicit use by a third party of the encrypted data can be prevented.

However, because data is encrypted within the host, the data processing workload on the host is increased, adversely affecting the performance of the application programs and the like running on the host.

In Japanese Patent Laid-open No. 2005-322201, technology is proposed enabling encryption of data within a storage subsystem.

Also, with increases in the quantity of data handled by companies and other organizations, there are an increasing number of organizations in which storage systems, configured as a plurality of storage subsystems, are managed and operated. The resulting increases in the cost of management of such storage subsystems are viewed as a problem. In order to hold down increases in management costs, there exists technology in which one or more storage subsystems (hereafter, such storage subsystems are called "external storage subsystems") are connected to a storage virtualization apparatus, and the storage virtualization apparatus provides the storage resources of one or more external storage subsystems, virtually, to a host, as the storage resources of a storage subsystem. The functions provided by such technology are called storage virtualization functions (or external storage connection functions), and are for example disclosed in Japanese Patent Laid-open No. 2005-107645.

In an environment in which one or more external storage subsystems are connected to a storage virtualization apparatus, when the encryption function of Japanese Patent Laid-open No. 2005-322201 is applied, it is thought natural to apply the encryption function to the storage virtualization apparatus. However, if the storage virtualization apparatus always executes encryption and decryption, the storage virtualization apparatus may become a performance bottleneck in the system.

SUMMARY

Hence an object of the invention is to alleviate the burden on a storage virtualization apparatus having encryption functions.

Further objects of the invention will become clear from the following explanation.

A storage virtualization apparatus comprises a judgment portion. The judgment portion performs a judgment as to whether the external storage subsystem having the external logical volume which is the write destination identified based on a write request received from a higher-level device has an encryption function. If the result of this judgment is negative, that is, if it is judged that the external storage subsystem does not have an encryption function, then the storage virtualization apparatus encrypts the data of the write request using its own encryption function and then transmits the encrypted data to the external storage subsystem. However, if the result of the judgment is positive, that is, if the external storage subsystem has an encryption function, then the storage virtualization apparatus transmits the data of the write request as-is, without performing encryption using its own encryption function, to the external storage subsystem, and the data is encrypted by the encryption function of the external storage subsystem.

BRIEF DESCRIPTION OF THE DRAWINGS

FIG. 4 shows an example of a RAID configuration table;

FIG. 5 shows an example of a VDEV configuration table;

FIG. 6 shows an example of a LU configuration table;

FIG. 7 shows an example of a port configuration table;

FIG. 8 shows an example of an EDEV configuration table;

FIG. 21 shows an example of an EDEV information table managed by a storage subsystem in a second embodiment of the invention;

DESCRIPTION OF THE PREFERRED EMBODIMENTS

Figure 1:
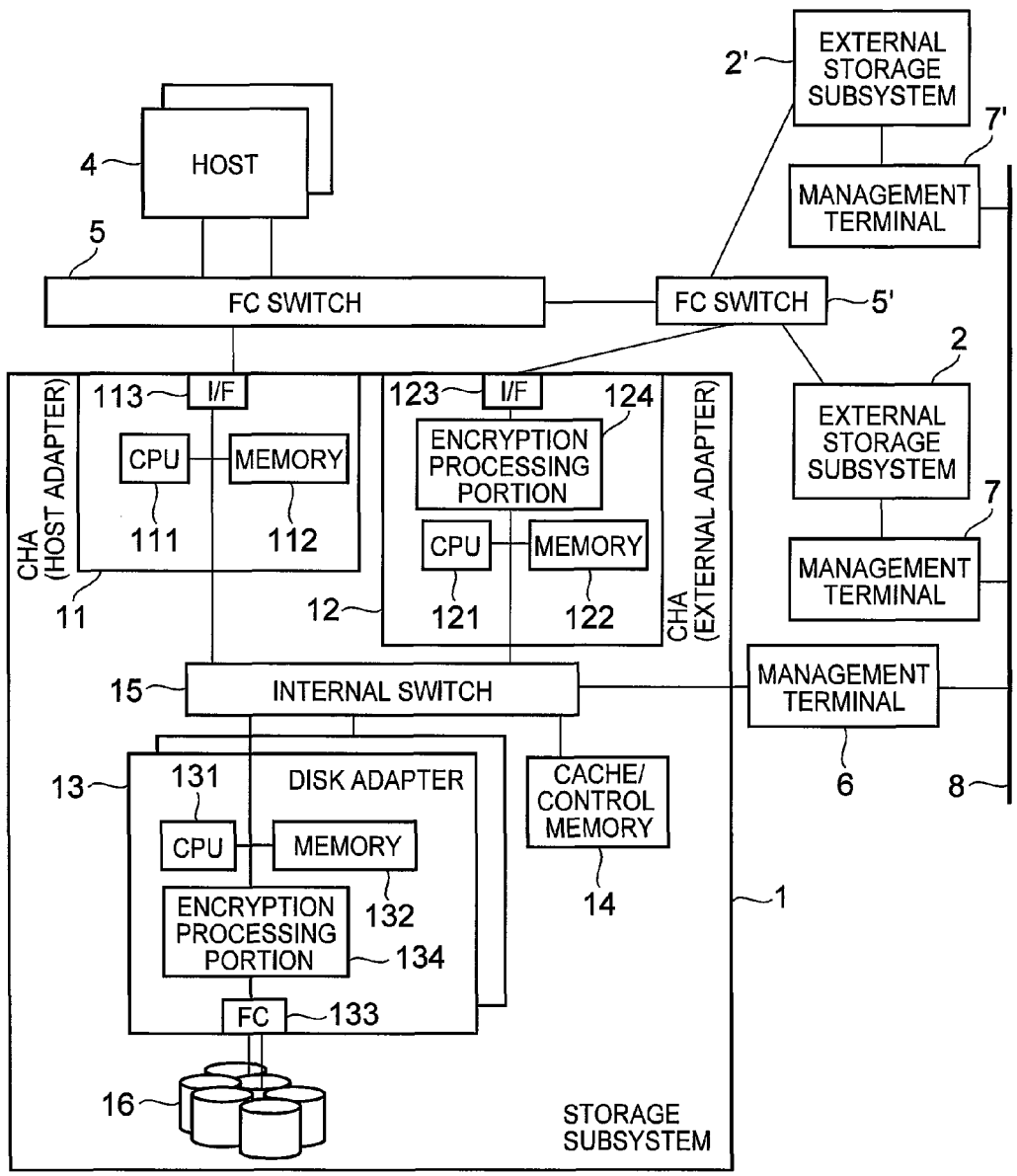
FIG. 1 shows an example of the physical configuration of the computer system of a first embodiment of the invention.

In one embodiment, the storage virtualization portion of a storage virtualization apparatus provides to a higher-level device, as a logical volume of the storage virtualization apparatus, a first external logical volume of a first external storage subsystem, which is a first storage subsystem existing externally. The storage virtualization apparatus can comprise an encryption processing portion (that is, an encryption function) which encrypts data; a cache region; a higher-level interface portion (for example, a communication port, or an interface circuit having a communication port), which receives data write requests from a higher-level device; an external interface portion (for example, a communication port, or an interface circuit having a communication port), which is an interface to an external storage subsystem; a cache portion, which stores in the cache region data received by the higher-level interface portion and/or the external interface portion; a judgment portion; and an I/O processing portion.

The judgment portion can perform a first judgment, as to whether a first encryption function is present on a first external storage subsystem having a first external logical volume identified based on a write request from a host device. Specifically, for example, management information, indicating the correspondence between logical volume IDs designated by a higher-level device and external logical volume IDs, and encryption-present information indicating whether or not an encryption function is present in the external storage subsystem having a particular external logical volume, can be stored in advance in the storage region of the storage virtualization apparatus. The judgment portion uses this management information to specify the external logical volume ID corresponding to the logical volume ID designated by the received write request, and moreover can also use the management information to specify whether the external storage subsystem having the external logical volume corresponding to the external logical volume ID has an encryption function.

If the result of the first judgment is positive, the I/O processing portion can transmit to the first external storage subsystem, via the external interface portion, a write request to write the data to the first external logical volume, without causing the encryption processing portion to encrypt the data in the cache region. If on the other hand the result of the first judgment is negative, the I/O processing portion can generate encrypted data by causing the encryption processing portion to encrypt data in the cache region, and can transmit to the first external storage subsystem, via the external interface portion, a write request to write this encrypted data to the first external logical volume.

In one embodiment, the storage virtualization apparatus can further comprise an encryption key registration portion, which registers, in a storage region, encryption keys, which is are electronic keys used by the encryption processing portion for data encryption. In this storage region, an encryption key may be associated with each logical volume, or may be associated with a different unit (for example, when a logical volume is partitioned into a plurality of subvolumes, in subvolume units).

In one embodiment, the storage virtualization apparatus can further comprise a copy processing portion. This copy processing portion can execute copy processing to copy data stored in a first external logical volume to a second external logical volume, on the occasion of modification of the encryption key stored in a storage region. In this case, at least after the completion of copy processing, the storage virtualization portion can, either instead of or in addition to the first external logical volume, provide to the higher-level device the second external logical volume as its own logical volume. In this embodiment, the second external logical volume may exist in the first external storage subsystem, or may exist in another external storage subsystem. Copy processing means the writing of data stored on the first external logical volume to a second external logical volume; data for copying from the first external logical volume may be deleted, or the data may be left intact. When deleted, the copy processing can be regarded as migration processing; when left intact, the copy processing can be regarded as replication processing.

In one embodiment, there is a second external storage subsystem, which is a second storage subsystem existing externally to the storage virtualization apparatus, and which has a second external logical volume. In this embodiment, the copy processing portion can execute the above-described copy processing, regardless of whether there has been encryption key modification.

In one embodiment, at the time of copy processing, the judgment portion can perform a second judgment, as to whether or not a second external storage subsystem has a second encryption function. The copy processing portion can control copy processing based on whether the result of the second judgment is positive or negative.

Specifically, for example, when the result of the second judgment is negative, if there is a first encryption function in the first storage subsystem, the copy processing portion may use the first encryption function of the first storage subsystem to cause decryption of the encrypted data of the first external logical volume, and may use the encryption processing portion of the storage virtualization apparatus to encrypt this decrypted data and write the data to the second external logical volume. Or, for example, when the result of the second judgment is negative, if there is no first encryption function in the first storage subsystem, the copy processing portion may write the encrypted data of the first external logical volume to the second external logical volume, either as-is, or after causing the encryption processing portion of the storage virtualization apparatus to perform decryption and then encryption.

Further, when for example the result of the second judgment is positive, if the first storage subsystem has a first encryption function, then the copy processing portion may cause the encrypted data of the first external logical volume to be decrypted by the first encryption function of the first storage subsystem, and may transmit the decrypted data as-is to the second external storage subsystem. Or, for example, when the result of the second judgment is positive, if there is no first encryption function in the first storage subsystem, the copy processing portion may cause the encrypted data of the first external logical volume to be decrypted by the encryption processing portion of the storage virtualization apparatus, and the data obtained by decryption may be transmitted as-is to the second external storage subsystem. In this case, the transmitted data is encrypted by the second encryption function in the second storage subsystem, and the encrypted data is written to the second external logical volume.

In one embodiment, when there is a first encryption function in the first external storage subsystem, the copy processing portion can receive, from the first external storage subsystem, data obtained by decryption, using the first encryption function, of encrypted data stored on the first external logical volume. On the other hand, when there is no first encryption function in the first external storage subsystem, the copy processing portion can receive, from the first external storage subsystem, encrypted data stored on the first external logical volume, and can cause execution by the encryption processing portion of decryption of the encrypted data using an encryption key stored in a storage region.

In one embodiment, when there is a second encryption function in the second external storage subsystem, the copy processing portion can transmit, to the second external storage subsystem, data obtained by decoding of encrypted data of the first external logical volume, without causing the encryption processing portion to perform encryption. On the other hand, when there is no second encryption function in the second external storage subsystem, the copy processing portion can cause the encryption processing portion to encrypt data obtained by decrypting encrypted data of the first external logical volume, and can transmit the encrypted data obtained by this encryption to the second external storage subsystem.

In one embodiment, if there is no second encryption function in the second external storage subsystem, and moreover data stored on the first external logical volume is encrypted data, which is data that has been encrypted by the encryption processing portion, then the copy processing portion can read the encrypted data from the first external logical volume, can decrypt the encrypted data using an encryption key stored in a storage region, can cause the encryption processing portion to execute encryption using an encryption key of the data obtained by decryption, and can transmit to the second external storage subsystem via the external interface portion a write request to write to the second external logical volume the encrypted data obtained by this encryption.

In one embodiment, the encryption key used in decryption (a first encryption key) and the encryption key used in encryption after decryption (a second encryption key) may be different. The encryption key registration portion can update the first encryption key stored in the storage region with the second encryption key used in encryption. This modification of the encryption key may be performed manually by a manager, or may be performed automatically by a prescribed algorithm.

In one embodiment, if the data stored on the first external logical volume is the encrypted data which is encrypted by the first encryption function, then the encryption key registration portion can acquire the encryption key stored in the first external storage subsystem and used by the first encryption function to encrypt the data, and can register the acquired encryption key in the storage region. This encryption key may be acquired directly from the first external storage subsystem, or may be acquired via a prescribed server, management device, and similar.

In one embodiment, when there is no second encryption function in the second external storage subsystem, the copy processing portion can read encrypted data stored on the first external logical volume from the first external logical volume as-is, without causing decryption by the first encryption function, and can write the encrypted data as-is to the second external logical volume, without causing encryption by the encryption processing portion.

In one embodiment, when there is no second encryption function in the second external storage subsystem, the copy processing portion can receive, from the first external storage subsystem via the external interface portion, data obtained by decryption by the first encryption function of encrypted data stored on the first external logical volume, can cause the encryption processing portion to encrypt the received data using an encryption key separate from the encryption keys registered in the storage region, and can write the encrypted data obtained by this encryption to the second external logical volume. The encryption key registration portion can update the encryption key stored in the storage region to the other separate encryption key.

In one embodiment, after encrypted data stored on the first external logical volume has been copied to the second external logical volume by the copy processing, the higher-level interface portion can receive a read request specifying the second external logical volume. As a first judgment, the judgment portion can judge whether or not there is a second encryption function in the second external storage subsystem having the second external logical volume identified based on the received read request. If there is no second encryption function in the second external storage subsystem, the I/O processing portion can, in response to the received read request, transmit to the second external storage subsystem a read request to read encrypted data from the second external logical volume, and in response to the transmitted read request, after the external interface portion has received the encrypted data read from the second external logical volume and the cache portion has stored the encrypted data in the cache region, the encryption processing portion can be caused to decrypt the encrypted data in the cache region using an encryption key registered in the storage region, and the data obtained by the decryption can be transmitted via the higher-level interface portion to the higher-level device.

In one embodiment, after encrypted data stored on the first external logical volume has been copied to the second external logical volume by copy processing, the higher-level interface portion can receive a write request specifying the second external logical volume. As a first judgment, the judgment portion can judge whether or not there is a second encryption function in the second external storage subsystem having the second external logical volume identified based on the received write request. If the result of the first judgment is positive, the I/O processing portion can cause the encryption processing portion to execute encryption of data in the cache region using an encryption key registered in the storage region, and can transmit to the second external storage subsystem, via the external interface portion, a write request to write the encrypted data obtained by this encryption to the second external logical volume.

In one embodiment, encrypted data of the first external logical volume may be written, as-is, to the second external logical volume without passing through the storage virtualization apparatus.

In one embodiment, the storage virtualization apparatus can further comprise an encryption key re-key portion, which modifies, periodically or irregularly, an encryption key stored in the storage region.

In one embodiment, the higher-level interface portion can receive data read requests from a higher-level device. The judgment portion can perform a first judgment as to whether there is a first encryption function in the first external storage subsystem of the first external logical volume identified based on a received read request. In response to the read request, the I/O processing portion can transmit to the first external storage subsystem a read request to read data from the first external logical volume, and the external interface portion can receive data from the first external storage subsystem, and after the cache portion stores the data in the cache region, if the result of the above-described first judgment is positive, the data in the cache region can be transmitted as-is to the higher-level device via the higher-level interface portion. If on the other hand the result of the first judgment is negative, the I/O processing portion can cause decryption of the encrypted data in the cache region by the encryption processing portion, and can transmit the data obtained by this decryption to the higher-level device via the higher-level interface portion.

In one embodiment, a higher-level device can be treated as a second external storage subsystem. Further, the storage virtualization apparatus may be a storage system having a plurality of logical volumes formed based on a plurality of physical storage devices (for example HDDs), or may be a switch device.

In one embodiment, when copy processing is executed, the encryption key registration portion of the storage virtualization apparatus can acquire an encryption key corresponding to the first external logical volume which is the copy source (for example, the migration source) from the first external storage subsystem which is the copy source, and if there is a second encryption function in the second external storage subsystem which is the copy destination (for example, the migration destination), can transmit the acquired encryption key to the second external storage subsystem. The second external storage subsystem can manage this encryption key in memory or similar, associated with the second external logical volume which is the copy destination. As a result, for example, when an I/O request is received designating the second external logical volume, the second external storage subsystem can employ the second encryption function to encrypt or decrypt the data of the I/O request, using an encryption key from the storage virtualization apparatus stored in memory or similar. If there is no second encryption function in the second external storage subsystem, the encryption processing portion of the storage virtualization apparatus can use an encryption key acquired from the first external storage subsystem which is the copy source to execute encryption of data to be written to the second external logical volume and decryption of data read from the second external logical volume.

Any arbitrary two or more of the above-described plurality of embodiments may be combined. Also, each of the above-described portions (for example, the storage virtualization portion, each of the interface portions, encryption processing portion, I/O processing portion, copy processing portion, encryption key registration portion, and encryption key re-key portion) can be constructed through hardware, a computer program, or a combination thereof (for example, with a portion realized by a computer program, and the remainder realized in hardware). A computer program is read into and executed by a prescribed processor. Further, upon information processing performed when a computer program is read by a processor, memory or another storage area existing in hardware resources may be used. Also, a computer program may be installed on a computer from a CD-ROM or other recording media, or may be downloaded to the computer via a communication network.

Below, a number of embodiments of the invention are explained in detail, referring to the drawings.

<First Embodiment>

FIG. 1 shows the physical configuration of the computer system of a first embodiment of the invention.

A SAN (Storage Area Network) is constructed using a plurality of FC (Fibre Channel) switches 5, 5'. A plurality of (or one) host computers (hereafter "hosts") 4 and the host adapter 11 of a storage subsystem 1 are connected to the FC switch 5 via Fibre Channel cables, and hosts 4 can transmit data I/O requests (for example, read requests and write requests) to the storage subsystem 1. In FIG. 1, the FC switch 5 and the FC switch 5' are connected, but this connection is not necessarily required. Further, the FC switch 5' is connected to an external adapter 12 of the storage subsystem 1 and to external storage subsystems 2, 2' via fibre channel cables, and the storage subsystem 1 can communicate via external adapter 12 with external storage subsystems 2, 2'.

Storage subsystem 1 can be for example a RAID (Redundant Arrays of Independent (or Inexpensive) Disks) system, comprising numerous HDDs 16 arranged in an array. However, other configurations are possible, and the storage subsystem 1 can also be configured as switches comprised by a communication network, such as for example multifunctional intelligent-type Fibre Channel switches. Also, the FC switch 5 may be equipped with the functions of the CHAs 11 and 12, disk adapters 13, and internal switches 15, described below, of a storage subsystem 1, so that a storage subsystem 1 can be constructed by combining the FC switch 5 with a plurality of HDDs 16.

The storage subsystem 1 has a storage virtualization function, which provides virtually to a host 4, as its own storage resources, the storage resources of storage subsystems 2, 2' existing externally to itself (hereafter "external storage subsystems"). The storage subsystem 1 comprises as a controller, for example, CHAs 11, 12, disk adapters 13, cache/control memory 14, and internal switches 15; access to the HDDs 16 is controlled by the controller.

The CHAs 11, 12 have one or a plurality of I/Fs (for example, communication ports, or communication control circuits comprising communication ports) 113, 123, connected to external devices (for example, hosts or other storage subsystems) to enable communication, and perform data communication with external devices. In this embodiment, CHA 11 is an adapter which communicates with a host computer 14, and is also called a "host adapter". CHA 12 is an adapter which communicates with an external storage subsystem 2, and also is called an "external adapter". Host adapters 11 and external adapters 12 are configured as microcomputer systems (for example, circuit boards) comprising CPUs 111, 121, memory 112, 122, and similar. Host adapters 11 and external adapters 12 may also be configured integrally.

I/F 123 of the external adapter 12 is provided with an encryption processing portion 124 which performs encryption and decryption of data input to the external adapter 12. The encryption processing portion 124 is configured, for example, so as to encrypt data input from within (for example, from an internal switch 15) the storage subsystem 1, and to decrypt data input from outside (for example from the FC switch 5') the storage subsystem 1.

In this embodiment, the host adapter 11 to communicate with host computers and the external adapters 12 to communicate with external storage subsystems 2, 2' are described as different hardware; but both of them may have the same hardware configuration, and for example an encryption processing portion may be placed behind the I/F 113 of the host adapter 11. At this time, by setting the host adapter 11 such that data input to and output from the host adapter 11 is not encrypted/decrypted (by for example setting prescribed flags in memory 112 or in the encryption processing portion), the encryption processing portion of the host adapter 11 can be made not to perform encryption or decryption of data input to or output from the host adapter 11.

Disk adapter (DKA) 13 has a communication port (for example an FC port) 133 for connection to HDDs 16, and can communicate with the HDDs 16 via this communication port 133. The DKA 13 is configured as a microcomputer system (for example a circuit board) comprising a CPU 131, memory 132, and similar. The DKA 22 can write data, written to the cache region of the cache/control memory 14 from CHAs 11, 12, to the HDDs 16, and can write data read from HDDs 16 to the cache region. Further, similarly to external adapters 12, an encryption processing portion 134 is present between the port 133 and the internal switch 15, which serves to encrypt data written from the cache region to HDDs 16 and to decrypt data read from HDDs 16 to the cache region.

The cache/control memory 14 is for example volatile or non-volatile memory. The cache/control memory 14 is memory having a cache region and a control region. Memory having a cache region and memory having a control region may be separated as well. In the cache region, data received from external devices (for example, hosts 4, external storage subsystems 2, and similar), and data read from HDDs 16, is stored temporarily. In the control region, information relating to control in the storage subsystem 1 (hereafter "control information") is stored. Control information comprises various tables, described below.

The internal switch 15 is for example a crossbar switch, which interconnects the CHAs 11, 12, DKAs 13, and cache/control memory 14. In place of the internal switch 15, a bus or other connecting means may be employed.

A management terminal 6 is connected to the internal switch 15. The management terminal 6 is a computer to manage the storage subsystem 1. The management terminal 6 can store various tables, described below, in the control region of the cache/control memory 14. Functions performed by the management terminal 6 may be provided in the host 4. That is, the host 4 may store the various tables, described below, in the control region of the cache/control memory 14.

The management terminals 7, 7' are both computers for management of external storage subsystems 2, 2', but other configurations are possible, and for example the management terminal 6 may manage the external storage subsystems 2, 2' as well. The management terminals 6, 7, 7' are interconnected via LAN (or various other communication networks) 8.

The above is an explanation of an example of the configuration of the computer system of a first embodiment of the invention. The above explanation is but one example, and there is no need to limit the configuration to that of this computer system. For example, The controller may have a simpler configuration, and for example may comprise a CPU and memory on one circuit board.

Figure 2:
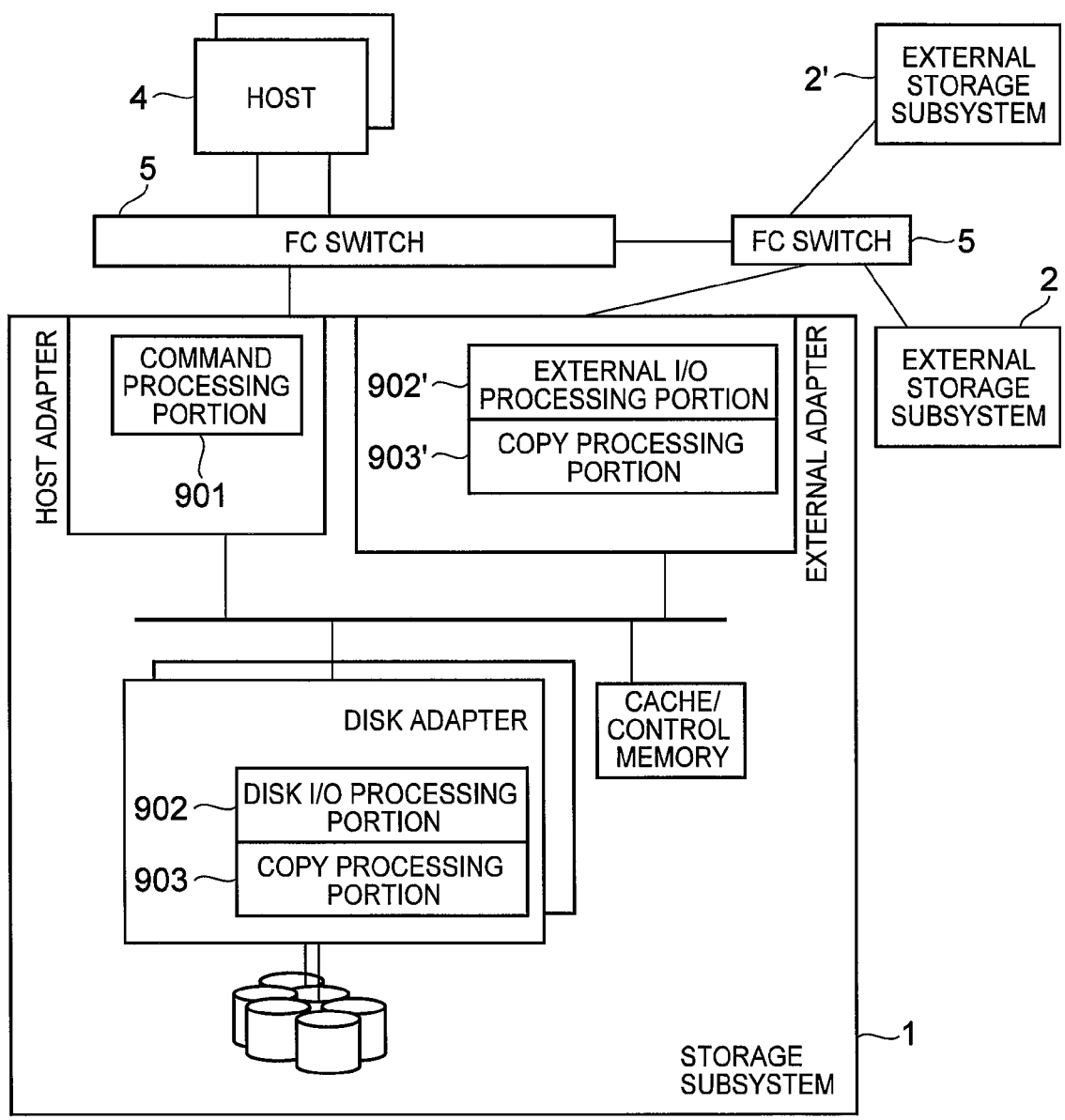
FIG. 2 shows an example of the logical configuration of the computer system of the first embodiment of the invention.

FIG. 2 shows an example of the logical configuration of the computer system of the first embodiment of the invention.

In the host adapter 11, the command processing portion 901 is for example stored in memory 112 as a computer program to be executed by the CPU 111. In the DKAs 13, for example, a disk I/O processing portion 902, copy processing portion 903, and logical/physical conversion portion 904 are stored in for example memory 122 as computer programs to be executed by the CPU 131. In the external adapter 12, for example, an external I/O processing portion 902' and copy processing portion 903' are for example stored in memory 132, as computer programs to be executed by the CPU 121. Below, explanatory sentences in which a computer program is the subject should in actuality be taken to refer to processing performed by a CPU which executes the computer program. The operation of each of the computer programs will be explained in detail below.

Figure 3:
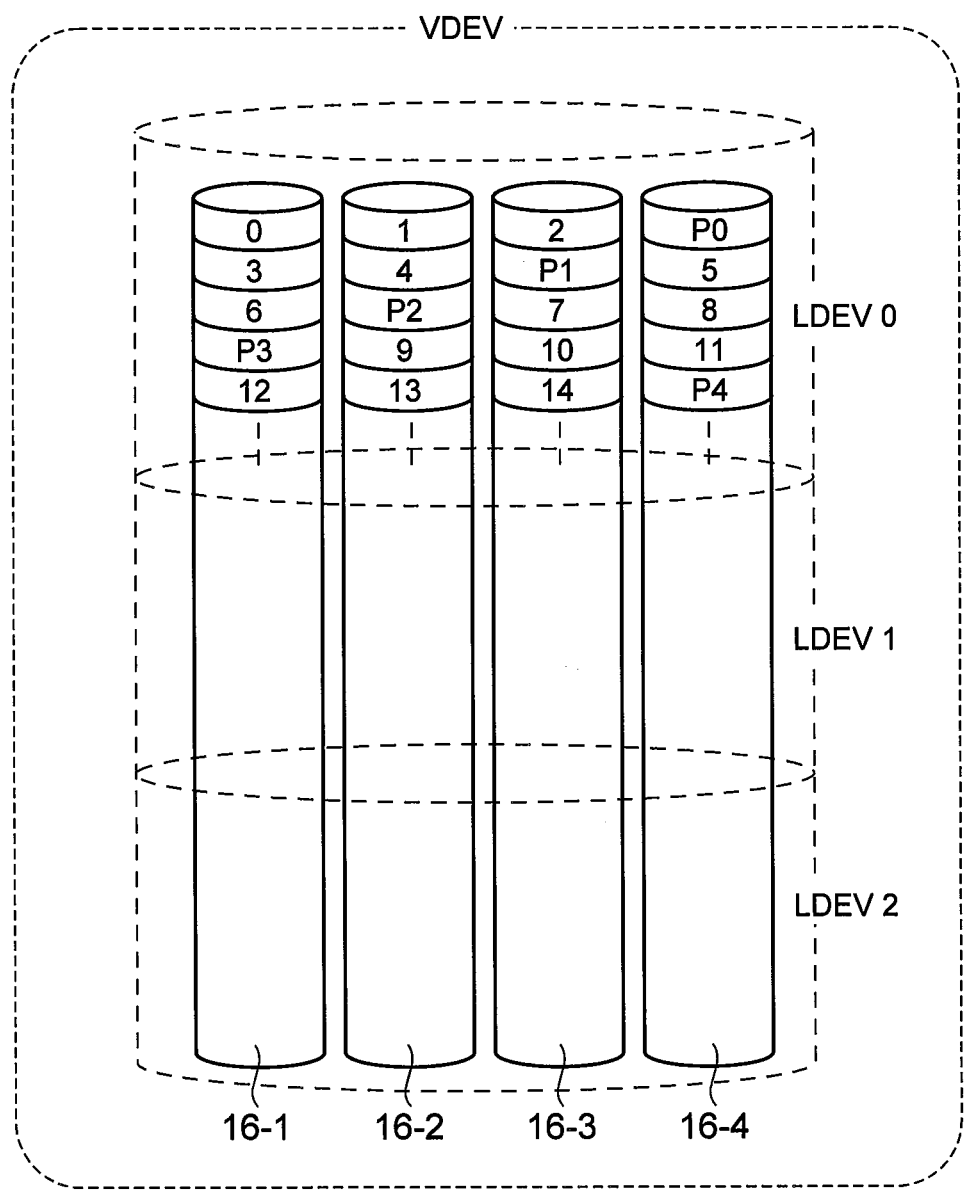
FIG. 3 shows an example of the relationship between a plurality of HDDs 16 and logical volumes.

FIG. 3 shows an example of the relationship between the plurality of HDDs 16 and logical volumes.

A single RAID group is configured from a plurality of (for example, four) HDDs 16-1, 16-2, 16-3, 16-4. In this example, three data items are stored on three HDDs 16, and parity data generated based on these three data items is stored in another HDD 16.

The storage space (the set of the storage spaces of the HDDs 16) provided by this RAID group is, in this embodiment, called "VDEV", as an abbreviation of "Virtual Device". The plurality of VDEV portions obtained by partitioning this VDEV are, in this embodiment, called logical volumes. A logical volume may be designated by a host 4, and is identified within the storage subsystem 1. Here, a logical volume designated by a host 4 is called an "LU" (Logical Unit), and a logical volume identified within a storage subsystem 1 may be called an "LDEV" (Logical Device). In the example of the figure, three LDEVs are formed in a single VDEV; but the number of LDEVs may be greater or less than this (for example, there may be one LDEV in one VDEV).

In this embodiment, by means of the above-described storage virtualization function, data write destinations and read sources can be in an external storage subsystem 2, instead of HDDs 16. Japanese Patent Laid-open No. 2005-107645 (U.S. patent application Ser. No. 10/769,805, U.S. patent application Ser. No. 11/471,556) teaches, for example, the technology concerning the storage virtualization functions, which is incorporated herein by reference.

Below, various tables comprised by the control information stored in cache/control memory 14 are explained, referring to FIG. 4 through FIG. 8.

FIG. 4 shows an example of a RAID configuration table.

The RAID configuration table 400 is a table used to manage the RAID configuration of each VDEV. Specifically, for example, this table 400 has a column 401 in which VDEV identification numbers are stored; a column 402 in which HDD identification numbers are stored; a column 403 in which RAID levels are stored; and a column 404 in which stripe sizes are stored. That is, in each VDEV, the VDEV identification number, the identification numbers of the plurality of HDDs comprised by the VDEV, the RAID level of the VDEV, and the stripe size are stored in this table 400.

FIG. 5 shows an example of a VDEV configuration table.

The VDEV configuration table 500 is a table used to manage the VDEV configuration. Specifically, for example, this table 500 has a column 501 in which VDEV identification numbers are stored; a column 502 in which LDEV identification numbers are stored; a column 503 in which the leading addresses of the logical address ranges in the VDEVs of LDEVs are stored; and a column 504 in which the ending addresses of the logical address ranges in the VDEVs of LDEVs are stored. That is, in this table 500 is stored information indicating the LDEVs which exist, with which identification numbers and in which logical address ranges, in each VDEV.

FIG. 6 shows an example of an LU configuration table.

The LU configuration table 600 is a table used to manage the configuration of LUs. Specifically, for example, this table 600 has a column 601 in which LDEV identification numbers are stored; a column 602 in which WWNs (World Wide Names) are stored; a column 603 in which LUNs (Logical Unit Numbers) are stored; a column 604 in which LDEV storage capacities are stored; and a column 605 in which encryption keys are stored. That is, in this table 600 are stored, in each LU, the LDEV identification number, the WWN and LUN associated with the LDEV; the LDEV storage capacity, and the encryption key associated with the LDEV. When data within each LDEV is encrypted, the encryption key is recorded in column 605. And when data within the LDEV is not encrypted, that is, when the LDEV is not used to store ciphertext, no encryption key is recorded in column 605 (0 is recorded).

In this embodiment, as explained above, a logical volume designated by a host 4 is called "LU"; specifically, for example, a logical volume associated with a WWN and LUN in the Fibre Channel protocol is called "LU". When a logical volume is used by a mainframe, the columns 602 and 603 for WWNs and LUNs need not be provided.

FIG. 7 shows an example of a port configuration table.

The port configuration table 5400 is a table used to manage the configuration of communication ports of the I/Fs 113, 123. Specifically, for example, this table 5400 has a column 5401 in which communication port identifiers (for example WWNs) are stored, and a column 5402 in which the communication port status is stored. The "TARGET" status indicates a communication port in the I/F 113 of a host adapter 11. That is, this means that the port is used to receive I/O requests from hosts. The "EXTERNAL" status indicates a communication port in the I/F 123 of an external adapter 12. That is, this means that the port is used to output I/O requests to an external storage subsystem 2 or other storage subsystem by means of storage virtualization functions. A plurality of I/Fs 113, 123 may exist in a single adapter 11 or 12, and the statuses of a plurality of ports within the single adapter 11 or 12 may all be different. Further, a plurality of communication ports may exist in one I/F 113, 123.

When there is an encryption processing portion in an I/F 113 of a host adapter 11, if the status of the communication port in the I/F 113 is "TARGET", then the encryption processing portion can be prevented from executing encryption and decryption. For example, by setting a flag in advance in the storage area in the encryption processing portion to halt execution of encryption and decryption, the encryption processing portion can be prevented from executing encryption and decryption.

FIG. 8 shows an example of the configuration of an EDEV information table.

Here, EDEV is an abbreviation of External Device, and is a storage space that is made from one or a plurality of HDDs existing in an external storage subsystem 2. By means of storage virtualization functions, the storage subsystem 1 operates as if it were itself a host computer, and performs read/write operations toward the storage space provided by external storage subsystems 2 or 2'. In this embodiment, storage subsystem 1 and the storage subsystems 2 or 2' communicate according to a SCSI-FCP protocol (a protocol stipulating SCSI commands exchanged on the Fibre Channel protocol), so that the storage subsystem 1 recognizes and accesses storage regions in external storage subsystems 2 or 2' as LUs determined uniquely by WWNs and LUNs in the Fibre Channel protocol. Consequently, an EDEV is equivalent to an LU existing in an external storage subsystem 2 or 2'. Within the storage subsystem 1, each EDEV is treated as similarly to an LDEV. That is, in the storage subsystem 1, an EDEV is not divided and handled as a plurality of LDEVs. This is a difference from VDEVs comprising one or a plurality of HDDs 16; but by assigning a WWN and LUN to one LDEV comprising an EDEV, a host 4 capable of access is not aware of a difference between an LDEV comprising HDDs 16 and an LDEV comprised by an external storage subsystem 2 or 2'. As one modified example, an EDEV of an external storage subsystem 2 or 2' can be divided into a plurality of continuous regions, as in the case of a VDEV comprising HDDs 16, so that a plurality of LDEVs can be handled as a single EDEV; but in the following explanations, it is assumed that one EDEV works as a single LDEV.

The EDEV information table 250 is a table used to manage information relating to each EDEV; one row presents information for one EDEV. Specifically, for example, this table 250 has a column 251 in which EDEV identification numbers are stored, and columns 252 and 253 in which WWNs (WWNs assigned to ports of external storage subsystems 2 or 2') and LUNs assigned to EDEVs are stored. In the column 254 "LDEV", the LDEV number corresponding to the EDEV is stored. In column 255, Cipher, values 0 or 1 are stored. When the value in column 255 "Cipher" is 1, it means that encryption and decryption for the EDEV of this row are performed by the encryption functions of the external storage subsystem 2 or 2'; when a value of 0 is stored in the column 255, it means that encryption and decryption for the LU designated in columns 252 and 253 are not performed by the external storage subsystem 2 or 2'. That is, if there is no encryption function in the external storage subsystem 2 or 2', the value in column 255 is 0. The value in column 255 may be set by a user who inputs a value via the management terminal 6, or may be set automatically by the storage subsystem 1 via the I/F 123, or through a management terminal 6, 7, 7', by querying the external storage subsystem 2, 2' as to the existence of encryption functions in the external storage subsystem 2, 2'. That an external storage subsystem 2 or 2' has encryption functions means that a controller (for example, at least one among a CHA or DKA) and/or HDDs of the external storage subsystem 2, 2' is equipped with an encryption processing portion similar to the above-described encryption processing portion.

The above is an explanation of the various tables. Below, the flow of various types of processing in this embodiment will be explained.

Figure 9:
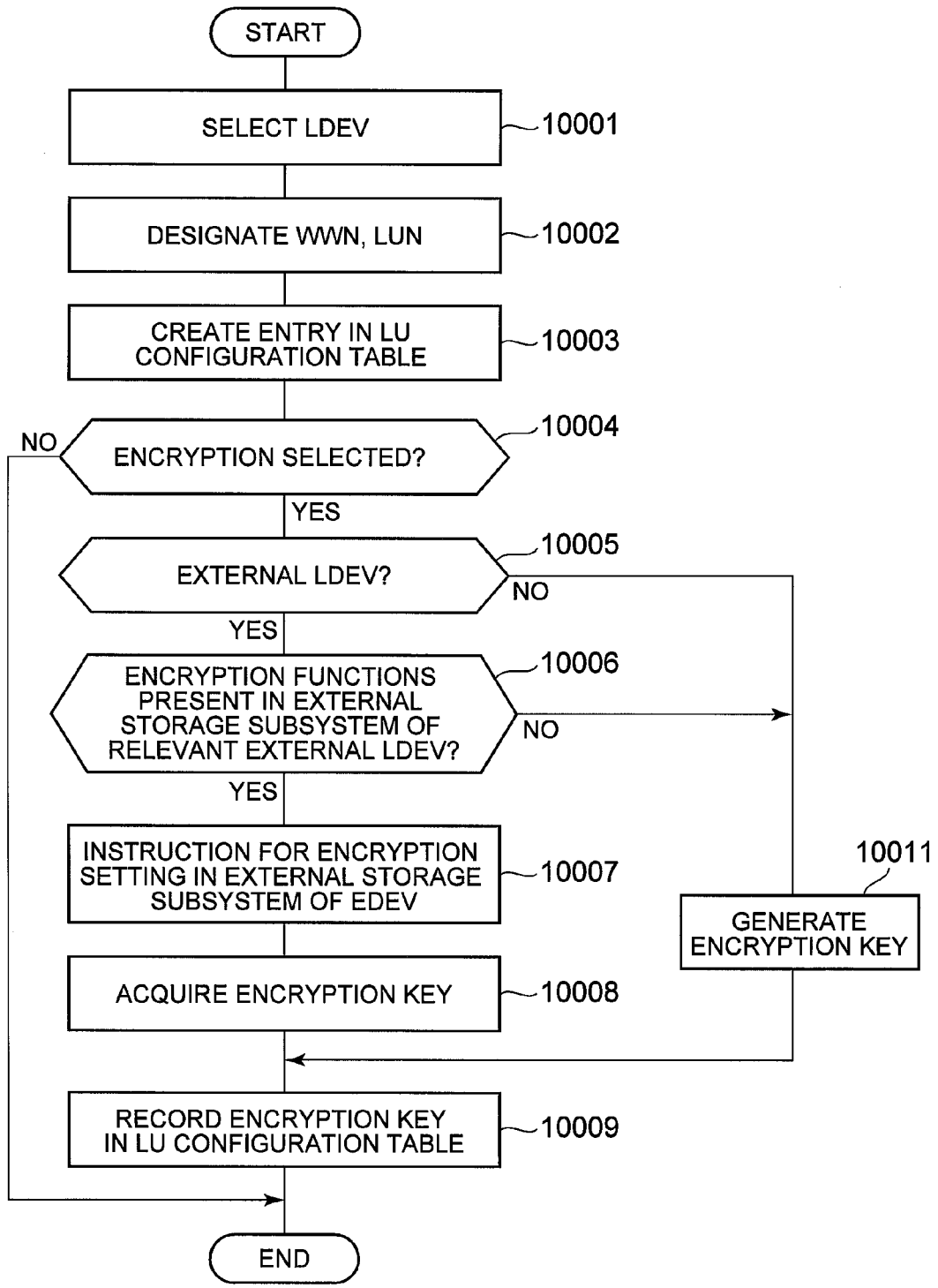
FIG. 9 shows the flow of processing for LU creation in a storage subsystem 1 of the invention.

FIG. 9 shows the flow of processing to change the state of an LDEV into the state in which LDEVs of storage subsystem 1 can be used by a host 4. Specifically, the processing makes an LDEV change into the state in which WWN and LUN are assigned to the LDEV, and the LDEV can be recognized and accessed by a host 4. Hereafter, this processing is called "LU creation". The processing of FIG. 9 is begun from a state in which an LDEV has been created. That is, prior to beginning the processing of FIG. 9, RAID formation from HDDs 16 and VDEV creation are performed for HDDs 16 in the storage subsystem 1, and division of the VDEV to create a plurality of LDEVs and to register the contents thereof in a VDEV configuration table 500, are completed, and moreover, with respect to the external storage subsystem, processing to recognize LUs in external storage subsystems 2, 2' as EDEVs by the storage subsystem 1, and registration as LDEVs in an EDEV information table is completed.

In step 10001, the user specifies, via the management terminal 6, one unused LDEV, that is, one LDEV to which a WWN and LUN have not been assigned. Next, the user operates the management terminal 6 and designates the WWN and LUN to assign to the LDEV (step 10002).

In step 10002, the WWN designation not is performed by directly designating the WWN; in general, a WWN is assigned in advance to the I/F 113 or other host I/F, and by identifying, from the GUI on the management terminal, the I/F 113 used during host 4 access, a result equivalent to WWN designation is achieved.

After the processing of steps 10001 and 10002, in step 10003 the storage subsystem 1 creates an entry for the LDEV in the LU configuration table 600, and inputs the values of the LDEV number (column 601), WWN (column 602), LUN (column 603), and capacity (column 604).

In step 10004, the user selects whether to encrypt data within the LDEV designated in steps 10001 and 10002. This selection is performed via the management terminal 6. When encryption is to be done, the processing proceeds to step 10005; when encryption is not to be done, the processing ends.

In step 10005, the storage subsystem 1 judges whether the designated LDEV is the one comprising HDDs 16 within the storage subsystem 1 (that is, whether the LDEV is an internal LDEV comprising a portion of a VDEV), or is the one comprising volumes of an external storage subsystem 2 or 2' (that is, whether the LDEV is an external LDEV equivalent to an EDEV). If the LDEV is an external LDEV equivalent to an EDEV, processing proceeds to step 10006, whereas if the LDEV is an internal LDEV, processing proceeds to step 10011. Hereafter, the designated LDEV is called "the relevant LDEV".

In step 10011, the storage subsystem 1 generates an encryption key used when encrypting the relevant LDEV. To generate the encryption key, a method of automatic generation using a random number generation algorithm or similar, or a method of designation by the user via the management terminal 6, may be employed. When step 10011 is completed, processing moves to step 10009, the storage subsystem 1 registers the encryption key generated in step 10011 in the row corresponding to the relevant LDEV of the LU configuration table 600, and LU creation processing ends.

In step 10006, the storage subsystem 1 judges whether the external storage subsystem of the relevant EDEV (external LDEV) has encryption functions. This judgment is performed by referring to the column 255 (Cipher) of the EDEV information table. When encryption functions are present, processing proceeds to step 10007, and when not present, processing proceeds to step 10011.

In step 10007, the storage subsystem 1 instructs the external storage subsystem 2 or 2' having the relevant EDEV (external LDEV) to configure the relevant EDEV as an encrypted volume. This instruction can take the form of an instruction from the management terminal 6 via a management terminal 7, 7', or the form of a direct instruction to the external storage subsystem 2, 2' via the I/F 123 of the external adapter 12.

In step 10008, the storage subsystem 1 acquires the encryption key to be used when encrypting the relevant EDEV (that is, the EDEV designated in step 10005) from the external storage subsystem 2, 2'. In step 10009, the acquired encryption key is recorded in the LU configuration table 600, and LU creation processing ends.

When encryption functions are present in the external storage subsystem 2 or 2' of the relevant EDEV, in this embodiment, since the encryption processing itself is performed by the external storage subsystem 2 or 2', the encryption key acquisition of step 10008 is not necessarily needed. However, to execute data migration processing described below and other processing, the encryption key corresponding to the EDEV is necessary. Therefore in step 10008 the encryption key is acquired and is stored in the LU configuration table 600. As one modified example, it is possible to skip step 10008, without acquiring the encryption key at this time, and when the encryption key becomes necessary in data migration processing described below or for other processing, a request may be issued from the storage subsystem 1 to the external storage subsystem 2 or 2' to acquire the encryption key.

Figure 10:
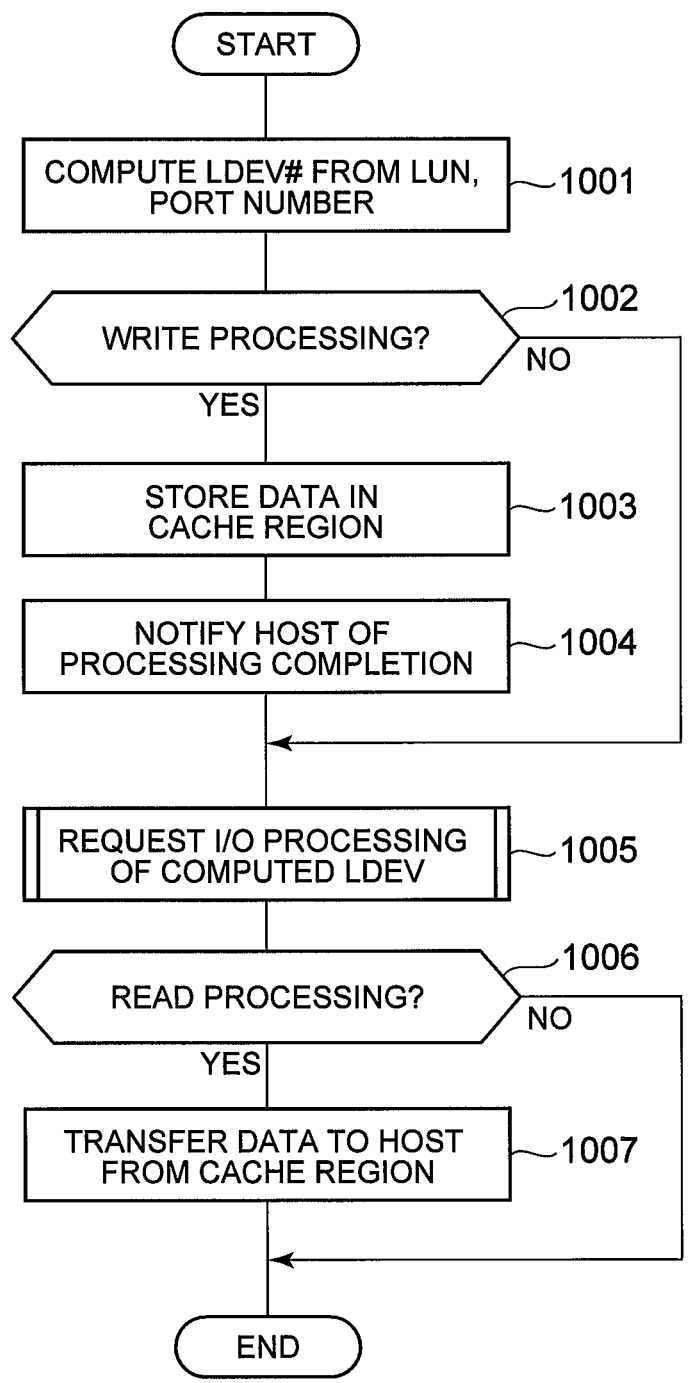
FIG. 10 shows the flow of processing executed when an I/O request is received by a host adapter from a host.

FIG. 10 shows the flow of processing by the command processing portion 901 when the storage subsystem 1 receives an I/O (read or write) request from a host 4.

When accessing an LU, the host 4 issues to the storage subsystem 1 an I/O request, designating the WWN and LUN assigned to the LU, and designating the address (LBA: Logical Block Address) in the LU for reading or writing data. In response to reception of the I/O request, the command processing portion 901 refers to the LU configuration table 600, and determines the LDEV identification number (LDEV number) corresponding to the LUN and WWN (step 1001). Next, the command processing portion 901 judges whether the I/O request from the host 4 is a write request (step 1002). In the case of a write request, processing proceeds to step 1003; in other cases (a read request), processing proceeds to step 1005.

In step 1003, the command processing portion 901 stores the write data (data for writing according to the I/O request) in an unused region of the cache region of cache/control memory 14, and in step 1004 notifies the host 4 that the write processing has been completed. The processing of step 1004 may be performed later, for example, after step 1005. At the time of step 1004, data writing to HDDs 16 or to the external storage subsystem 2, 2' is not completed, but by notifying the host 4 of the completion of processing at the time the write data has been stored in the cache region, the response time for write processing can be made shorter.

In step 1005, the command processing portion 901 performs read or write processing for the LDEV to which the LDEV number determined in step 1001 has been assigned. The processing of step 1005 is explained in detail in FIG. 11 and below.

In step 1006, the command processing portion 901 judges whether the received I/O request is a read request. If the request is a read request, the read data (the data for reading according to the read request) from a HDD 16, or from an external storage subsystem 2 or 2', has been stored in the cache region by the processing of the above-described step 1005, and so the command processing portion 901 returns the read data in the cache region to the host 4 (step 1007). If in step 1006 the request is judged not to be a read request, this processing ends.

Figure 11:
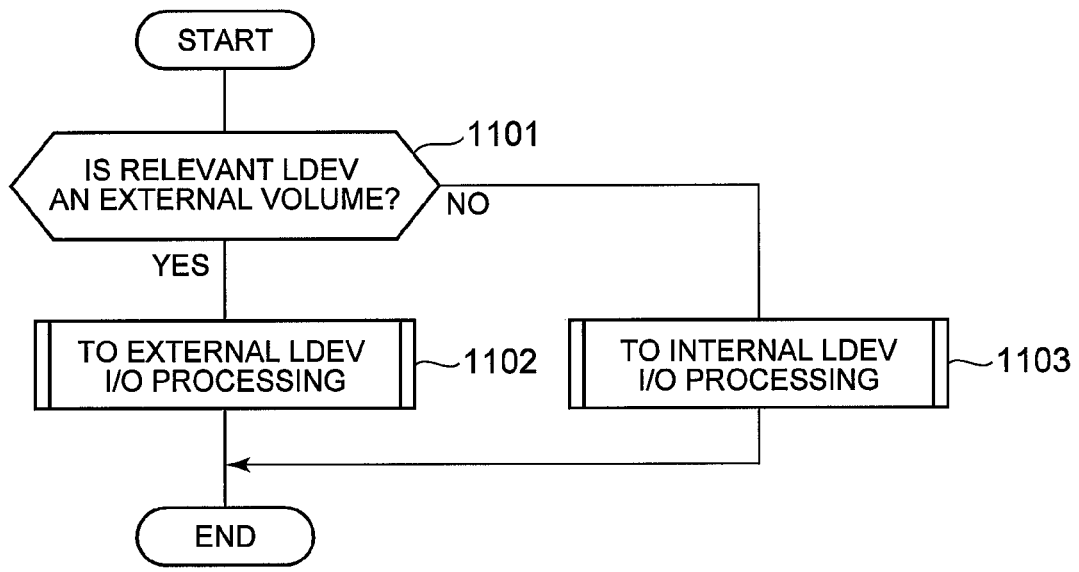
FIG. 11 shows the flow of processing of an I/O request to an LDEV in a storage subsystem.

FIG. 11 shows the flow of I/O processing of the LDEV performed by the command processing portion 901, that is, the details of the processing of step 1005 in FIG. 10.

If write processing is executed, write data in the cache region is transferred to the HDD 16 or to the external storage subsystem 2, 2', and if read processing is executed, read data from the HDD 16 or from the external storage subsystem 2, 2' is transferred to the cache region by executing this processing. This processing is performed in cases when an I/O request from a host 4 is executed, and in cases when data migration processing, described below, and other processes are executed.

The command processing portion 901, in step 1101, refers to the VDEV configuration table 500 and EDEV configuration table 650, and distinguishes whether the designated LDEV is an internal LDEV or an external LDEV. If the LDEV is an internal LDEV, processing proceeds to step 1103, and the command processing portion 901 calls the disk I/O processing portion 902 executed by the disk adapter 13 to perform subsequent processing. In the case of an external LDEV, processing proceeds to step 1102, and the command processing portion 901 calls the external I/O processing portion 902', and causes execution of I/O processing of the external storage subsystem 2 or 2'. The processing of steps 1102 and 1103 is explained in detail using FIG. 16, FIG. 12 and FIG. 13.

Figure 12:
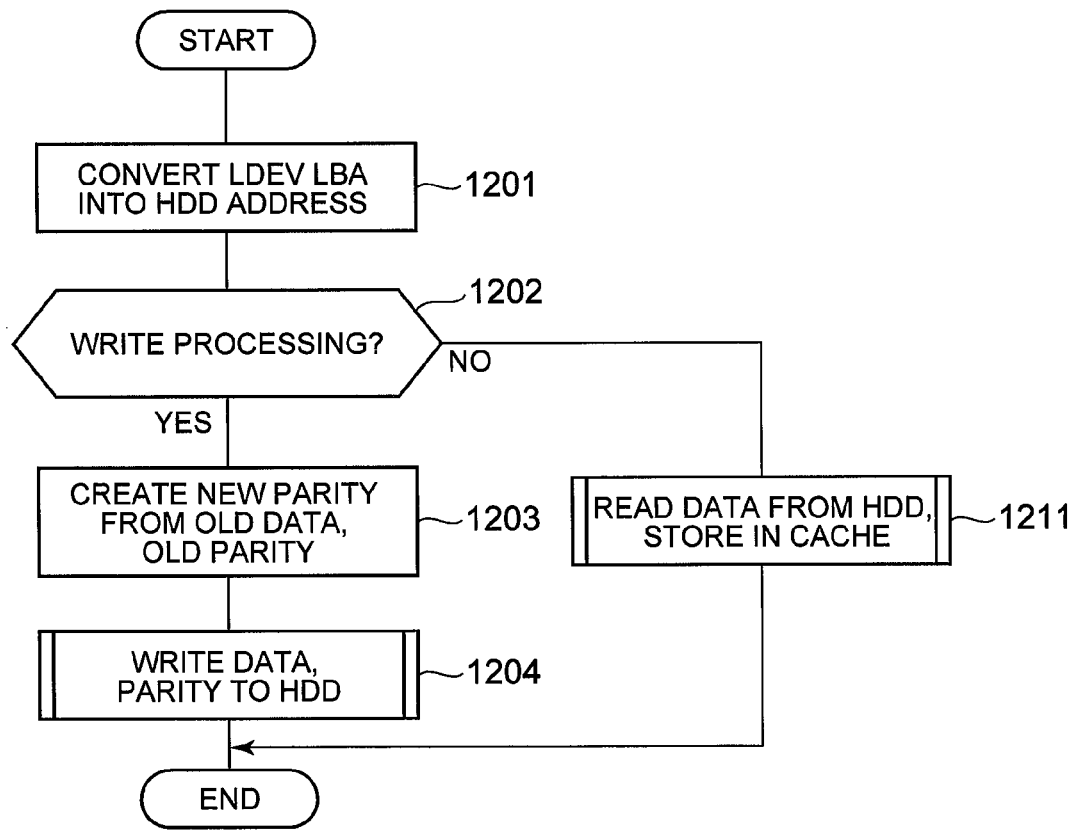
FIG. 12 shows an example of the flow of processing of an I/O request to an internal LDEV.
Figure 13:
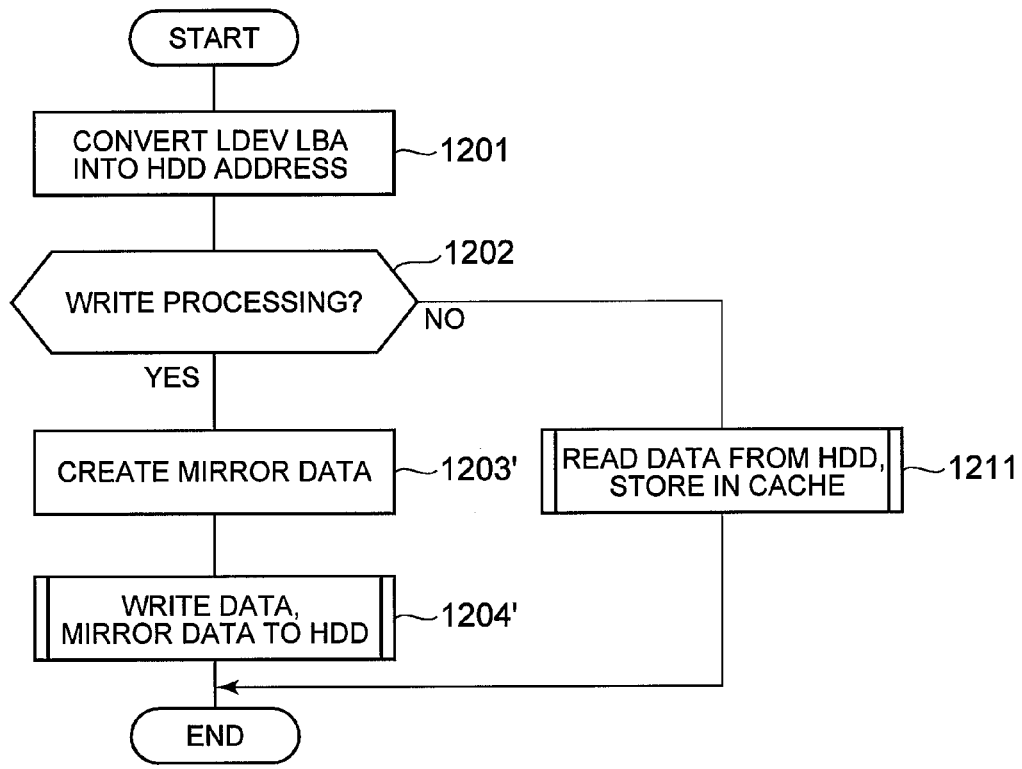
FIG. 13 shows an example of the flow of processing of an I/O request to an internal LDEV.

FIG. 12 and FIG. 13 show examples of the flow of internal LDEV I/O processing. FIG. 12 shows an example of a case in which the internal LDEV is comprised by a VDEV with a RAID-5 configuration; FIG. 13 shows an example of a case in which the internal LDEV is comprised by a VDEV with a RAID-1 configuration.

In explaining FIG. 12, the relevant internal LDEV is called the "internal LDEV for processing", and HDDs belonging to the relevant VDEV are called "HDDs for processing"; an address on a HDD associated with a volume region specified by an LBA designated by an I/O request from a host 4 is called a "physical address for processing".

In step 1201, the LBA designated by the I/O request from the host 4 is converted into a physical address for processing. Specifically, for example, the command processing portion 901 sends to the DKA 13 an I/O request comprising the LBA designated in the I/O request from the host 4, and the disk I/O processing portion 902 within the DKA 13 receives this I/O request. The I/O request may be written in the control region of the cache/control memory 14 to enable DKA 13 to receive it, or may be transmitted to the DKA 13 via the internal switch 15. The DKA 13 receiving the I/O request is a DKA 13 to which each of the HDDs 16 for processing is connected. The disk I/O processing portion 902 of the DKA 13 converts the LBA in the received I/O request into a physical address for processing.

In step 1202, the disk I/O processing portion 902 judges whether the received I/O request is a write request or a read request. In the case of a write request, processing proceeds to step 1203, and in the case of a read request, processing proceeds to step 1206. This step 1202 may also be completed before the end of step 1201.

In step 1203, the disk I/O processing portion 902 uses the data placed in the cache region for writing to the internal LDEV for processing (new data), and the data currently stored in the LDEV for processing with the new data as well as the parity (old data and old parity), to generate the new parity.

In step 1204, the disk I/O processing portion 902 transmits to each of the HDDs 16 a write request for the new data and new parity, designating the physical address for processing, and the new data and the new parity are written to each of the HDDs 16. This processing is explained in detail in FIG. 14.

In step 1211, the disk I/O processing portion 902 transmits to each HDD 16 for processing a read request, designating a physical address for processing. By this means, ciphertext from each HDD 16 for processing is converted into plaintext and read out, and is stored in the cache region. The details of this processing are explained in FIG. 15.

Next, in FIG. 13 the flow of I/O processing when the internal LDEV is in a RAID-1 VDEV is explained. The only differences with FIG. 12 are that steps 1203 and 1204 in FIG. 12 are modified to steps 1203' and 1204' in FIG. 13. In step 1203', instead of creating the parity, a mirror copy of the data for write processing is created and is stored in the cache region. In step 1204', the data for writing and the mirror copy are transmitted to the HDDs 16. Since the mirror copy is a replication of the original write data, the data contents are the same. Therefore the processing of step 1203' is not necessarily required, and similar processing can be accomplished, without creating a mirror copy in step 1203', by transmitting the data stored in the cache region to both the HDD 16 to store the write data and the HDD 16 to store the mirror copy in step 1204'.

Figure 14:
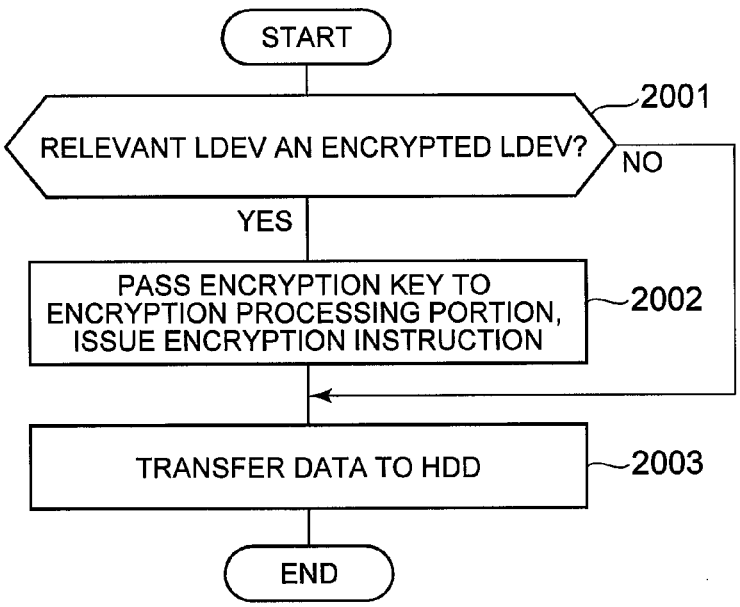
FIG. 14 shows an example of write processing to an HDD.

FIG. 14 shows an example of data write processing, in which the disk I/O processing portion 902 performs toward the HDDs 16.

In this embodiment, when the LDEV is configured to encrypt data within the LDEV (e.g. when an encryption key is stored in the key field 605 of the corresponding LDEV in the LU configuration table 600), it is called "LDEV for encryption".

In step 2001, the disk I/O processing portion 902 performs reverse-address conversion from the physical address for processing designated in the write request to the LDEV for write processing and address thereof, and refers to the LU configuration table 600 to judge whether the LDEV for write processing calculated by this reverse-address conversion is an LDEV for encryption. If the LDEV for write processing is an LDEV for encryption, then processing proceeds to step 2002, and if not an LDEV for encryption, processing proceeds to step 2003.

In step 2002, the disk I/O processing portion 902 passes the encryption key corresponding to the LDEV for writing to the encryption processing portion 134, and issues an instruction for encryption processing. As a result of this processing, during the data transfer processing to HDDs 16 performed in the next step 2003, the transferred data is encrypted by the encryption processing portion 134.

In step 2003, the disk I/O processing portion 902 transfers data from the cache region to each of the HDDs 16 for processing. If an encryption processing instruction has been issued in step 2002, during the data transfer process, the transferred data is encrypted by the encryption processing portion 134, and is then written to the HDDs 16.

Figure 15:
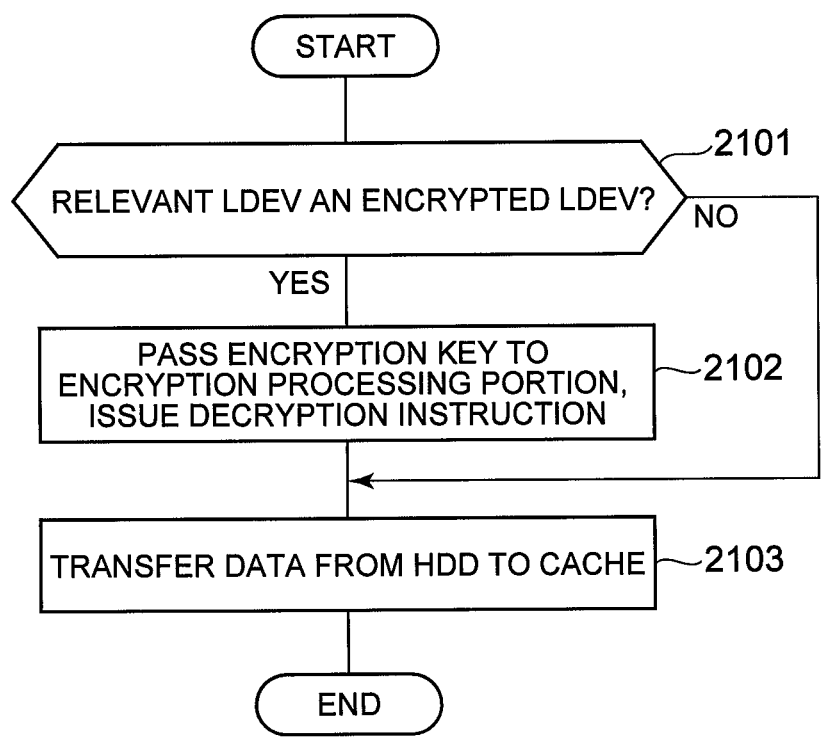
FIG. 15 shows an example of write processing to an HDD.

FIG. 15 shows an example of processing to read data from HDDs 16 by the disk I/O processing portion 902.

In step 2101, similarly to step 2001, the disk I/O processing portion 902 specifies the LDEV for processing by performing reverse-conversion processing to determine the LDEV to which the physical address (LBA) for processing designated by the read request is equivalent, and refers to the LU configuration table to judge whether the LDEV for processing is an LDEV for encryption. If the LDEV for processing is an LDEV for encryption, processing proceeds to step 2102, and if not, processing proceeds to step 2103.

In step 2102, processing similar to that of step 2002 is performed. Specifically, the disk I/O processing portion 902 passes the encryption key corresponding to the LDEV for read processing to the encryption processing portion 134, and issues an instruction for decryption processing. By means of this processing, in the processing to transfer data from HDDs 16 to the cache region performed in the next step 2103, the transferred data is decrypted by the encryption processing portion 134.

In step 2103, the disk I/O processing portion 902 reads data from the HDD 16 for processing. When the decryption processing instruction of step 2102 is performed, transferred data in the data transfer process is decrypted by the encryption processing portion 134 and is stored in the cache region.

Figure 16:
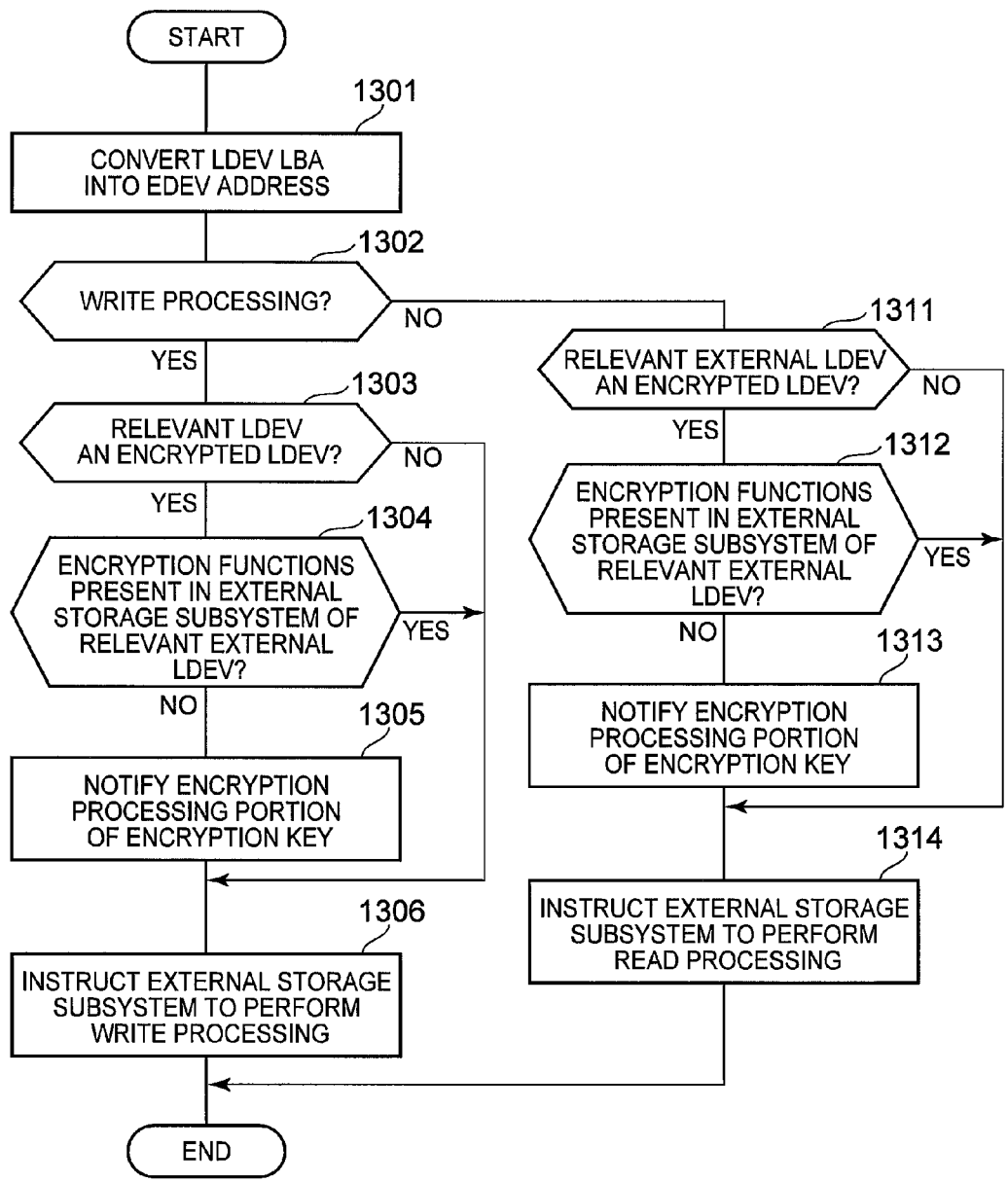
FIG. 16 shows an example of the flow of processing of an I/O request to an external LDEV.

FIG. 16 shows an example of the flow of external LDEV I/O processing. In the explanation of FIG. 16, the external LDEV which is the access destination is called the "external LDEV for processing", the EDEV comprising the external LDEV for processing is called the "EDEV for processing", and the address in the EDEV for processing, computed from the LBA designated in the I/O request from the host 4, is called the "EDEV address for processing".

In step 1301, the LBA designated in the I/O request from the host 4 is converted into an EDEV address for processing. Specifically, for example, the command processing portion 901 determines the LUN, WWN and LBA to be designated in the I/O request to the external storage subsystem 2 as the EDEV address for processing, based on the LUN, WWN and LBA designated in the I/O request from the host 4. This address conversion can for example be performed by a method disclosed in the above-described Japanese Patent Laid-open No. 2005-107645 ((U.S. patent application Ser. No. 10/769,805, U.S. patent application Ser. No. 11/471, 556).

In step 1302, the external I/O processing portion 902' judges whether the received I/O request is a write request or a read request. If it is a write request, processing proceeds to step 1303; if it is a read request, processing proceeds to step 1311.

In step 1303, the external I/O processing portion 902' judges whether the external LDEV for processing is an LDEV for encryption, by checking the value in column 605 for the LDEV for processing in the LU configuration table 600. If the LDEV is an LDEV for encryption, processing proceeds to step 1304, and otherwise processing proceeds to step 1306.

In step 1304, the external I/O processing portion 902' refers to the EDEV information table 250, to judge whether the external storage subsystem 2 or 2' in which the external LDEV for processing exists has encryption functions. If encryption functions are present, then encryption processing is performed by the external storage subsystem 2 or 2', and therefore encryption processing is not performed within the storage subsystem 1. For this reason, processing proceeds to step 1306. If encryption functions are not present, processing proceeds to step 1305.

In step 1305, the external I/O processing portion 902' identifies the encryption key corresponding to the external LDEV for processing from the LU configuration table 600, and notifies the encryption processing portion 124 of the specified encryption key. As a result, in the process of transferring write data to the external storage subsystem 2 or 2' in step 1306, plaintext (write data for transfer) is encrypted in the encryption processing portion 124.

In step 1306, the plaintext (write data) stored in the cache region is encrypted by the encryption processing portion 124 in the process of transfer to the external storage subsystem 2 or 2', and the ciphertext is stored in the external storage subsystem 2 or 2' having the external LDEV for processing by the external I/O processing portion 902'.

In step 1311, similarly to step 1303, a judgment is made as to whether the external LDEV for processing is an LDEV for encryption. If it is an LDEV for encryption, processing proceeds to step 1312, and if it is not an LDEV for encryption, processing proceeds to step 1314.

In step 1312, similarly to the processing of step 1304, a judgment is made as to whether the external storage subsystem 2 or 2' in which the external LDEV for processing exists has encryption functions. If encryption functions are present, processing proceeds to step 1314, and if encryption functions are not present, processing proceeds to step 1313.

In step 1313, similarly to the processing in step 1305, an encryption key is set in the encryption processing portion 124. In step 1314, data reading from the external storage subsystem 2 or 2' is executed. Specifically, for example, the external I/O processing portion 902' issues a read request to the external storage subsystem 2 together with the EDEV address for processing. In response to this read request, the I/F 123 of the external adapter 12 receives ciphertext from the external storage subsystem 2, and this ciphertext is stored in the cache region. In a case in which the encryption key has been set in the encryption processing portion 124 at step 1313 and it is in the state that the decryption is to be performed, decryption is executed using the previously set encryption key by the encryption processing portion 124 in the process of storage in the cache region, so that plaintext is stored in the cache region.

Next, volume migration and re-key processing in this embodiment are explained, using FIG. 17 through FIG. 20.

Volume migration processing is for example used when the ways of use of data and/or access frequency of data changes, and when data locations are changed in accordance with the replacement of a storage subsystem. For example, as the frequency of use of data in an internal LDEV comprising HDDs 16 declines, the data may be migrated to an external LDEV of an external storage subsystem 2 or 2', or, when an external storage subsystem 2 is to be discarded, data which had been in external LDEVs within the external storage subsystem 2 is migrated to an external storage subsystem 2' or to HDDs 16.

Also in this embodiment, in order to enhance security, processing is executed to change the encryption key, either periodically or irregularly. In the explanation of the present embodiment, this is called "re-key processing". When re-key processing is executed, ciphertext is first converted into plaintext, and then an encryption key different from the encryption key used previously is employed to perform re-encryption, and the result of the re-encryption (ciphertext) is written to another LDEV. Re-key processing may be performed simultaneously with volume migration, but in the following explanation of this embodiment, it is assumed that volume migration and re-key processing are performed separately.

Figure 17:
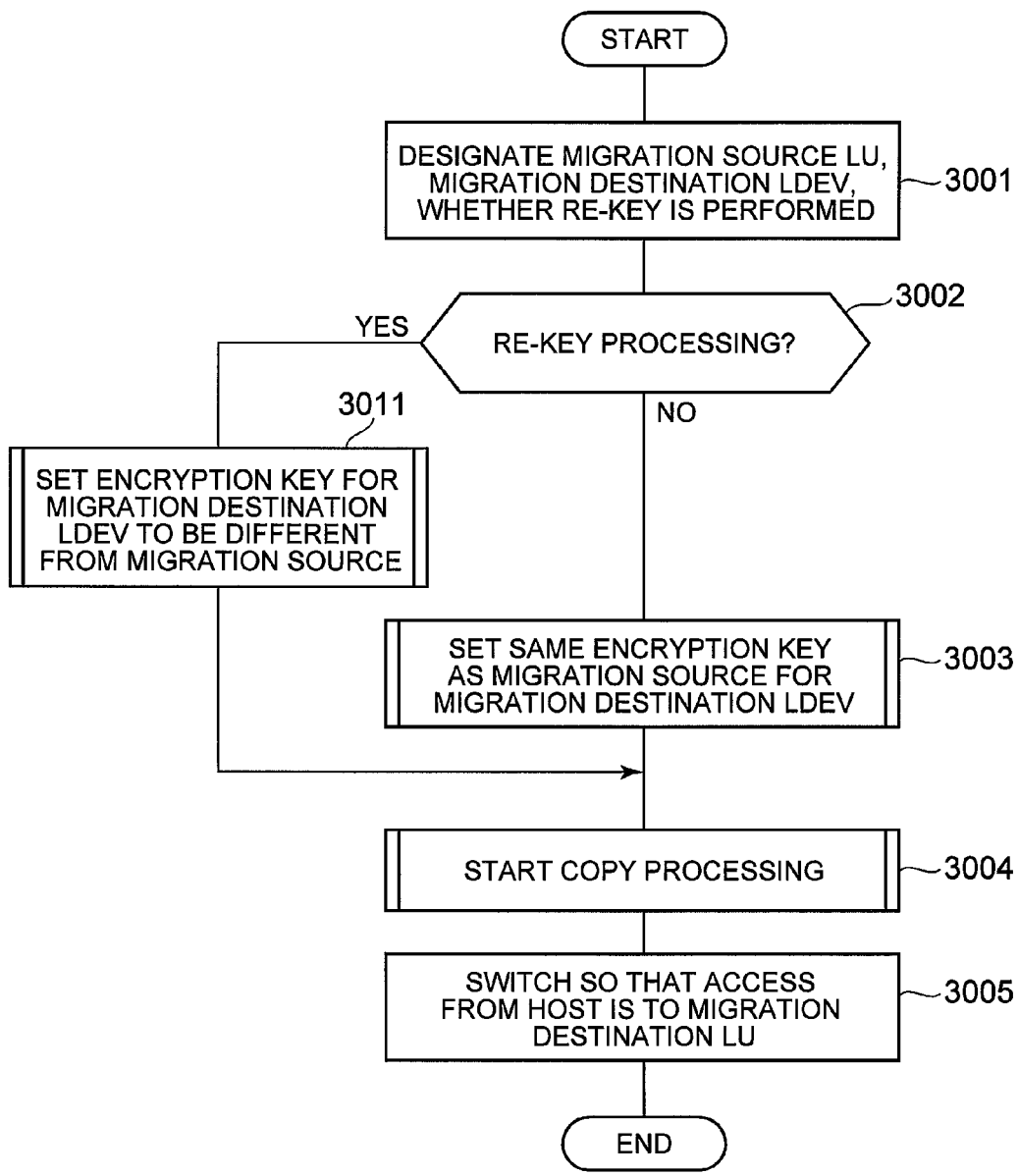
FIG. 17 shows the flow of migration/re-key processing.

Using FIG. 17, a summary explanation is given of the series of migration/re-key processing, comprising volume migration processing and re-key processing.

In migration/re-key processing, the user designates a migration source LDEV and a migration destination LDEV in the storage subsystem 1 via the management terminal 6, and causes migration processing to be executed. The migration source LDEV may be designated using the LDEV number, or the combination of WWN and LUN assigned to the migration source LDEV may be designated. The migration destination LDEV is designated using the LDEV number for data migration. Or, a currently unused LDEV may be automatically selected in the management terminal 6 or in the storage subsystem 1. A migration instruction may be issued by the user via the management terminal 6, or, when management software for the storage subsystem 1 is installed on the host 4, migration can be performed via this management software. Or, data migration or re-key processing may be performed periodically; in this case, the user merely designates the data migration or re-key period (in six month units or similar) via the management terminal 6, and subsequent processing may be performed automatically within the storage subsystem 1.

Migration/re-key processing is primarily executed using the copy processing portion 903 or 903' of the storage subsystem 1. Below, processing performed by the copy processing portion 903 and/or 903' is mainly explained.

First, in step 3001, the copy processing portion 903 and/or 903' receive the LDEV number of the migration source LDEV, the LDEV number of the migration destination LDEV, and the indication whether re-key processing is to be performed from the management terminal 6. In step 3002, the copy processing portion 903 and/or 903' judges whether there has been an instruction for re-key processing, and if there has been a re-key instruction, processing proceeds to step 3011, and if not, processing proceeds to step 3003.

In step 3003, the copy processing portion 903 and/or 903' modifies the setting contents in the LU configuration table 600 such that the data stored in the migration destination LDEV is encrypted with the same key as in the migration source LDEV. Specifically, the copy processing portion 903 and/or 903' searches for the row in the LU configuration table 600 corresponding to the migration source LDEV number, and inputs the encryption key associated with the migration source LDEV number without modification, that is, the encryption key stored in the field at which the identified row and column 605 (Key) intersect (hereafter called the "key registration field"), is stored into the key registration field of the row corresponding to the migration destination LDEV number. When the migration destination LDEV is an external LDEV, the copy processing portion 903 and/or 903' may have to transmit the encryption key associated with the migration source LDEV from the storage subsystem 1 to the external storage subsystem 2 or 2' in which the external LDEV exists, and the encryption key may have to be set in the external storage subsystem 2 or 2'. This processing is explained in detail using FIG. 18.

On the other hand, when processing proceeds to step 3011, the encryption key is changed, and so the copy processing portion 903 and/or 903' generates an encryption key different from the encryption key stored in the key registration field of the row corresponding to the migration source LDEV number, and registers the generated encryption key in the key registration field corresponding to the migration destination LDEV number, so that the migration destination LDEV is encrypted with an encryption key different from that of the migration source LDEV. As an example of the method of encryption key generation, a method employing a random number generation algorithm may be used; in addition, the user can be made to directly designate an encryption key, or the user can be made to input a single text string or similar to the management terminal 6, and based on this input the storage subsystem 1 can use a hash algorithm or similar to generate a new encryption key. When the processing of step 3003 or 3011 is completed, processing proceeds to step 3004.

In step 3004, the copy processing portion 903 and/or 903' performs processing to copy data from the migration source LDEV to the migration destination LDEV (copy processing). Details of the copy processing are explained in FIG. 19.

When copy processing is completed, settings are switched such that subsequently the host 4 can access the migration destination LDEV. Specifically, the copy processing portion 903 and/or 903' updates the contents of the LU configuration table 600 such that, in the LU configuration table 600, the WWN and LUN which had until then been assigned to the migration source LDEV are assigned to the migration destination LDEV. When the contents of the LU configuration table 600 are updated, subsequent I/O processing from the host 4 is performed not on the migration source LDEV, but on the migration destination LDEV. The command processing portion 901 interrupts processing of an I/O request received from the host 4 during processing of step 3005 until the processing of step 3005 is completed, and at the time of completion of the processing of step 3005, can then resume processing.

Figure 18:
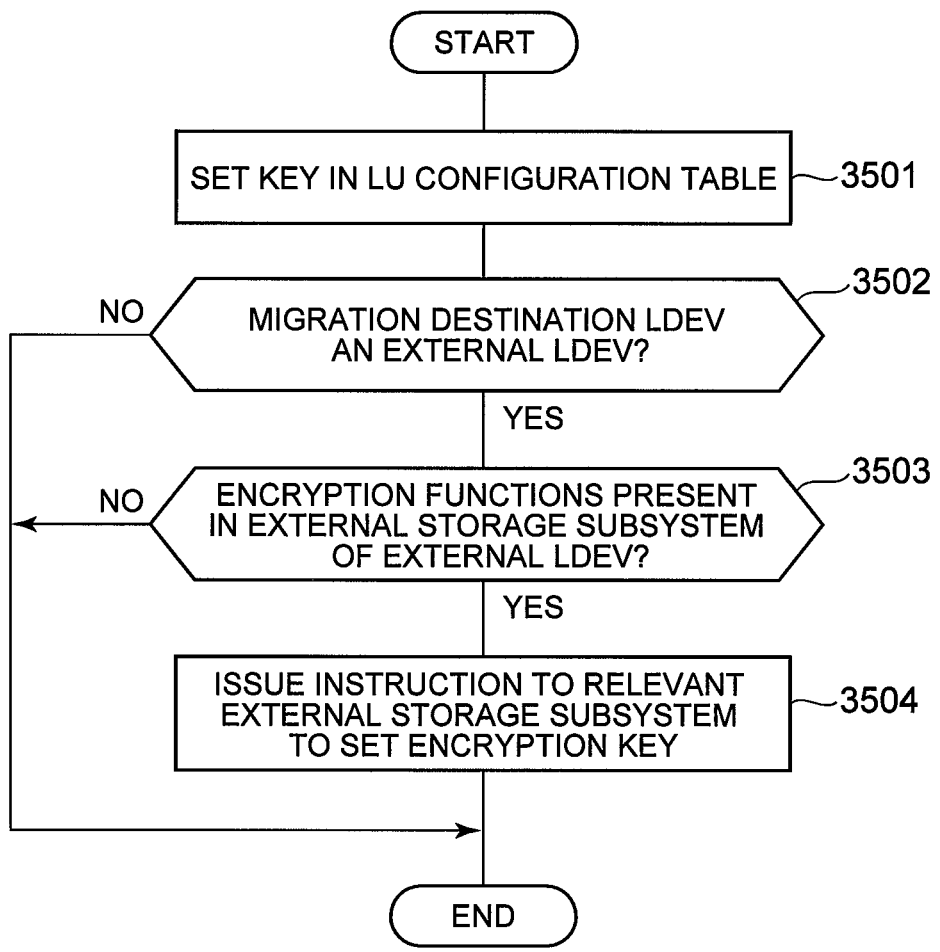
FIG. 18 shows the flow of re-key processing.

FIG. 18 shows the processing of step 3003 or 3011, that is, the processing to assign the key to the migration destination LDEV.

In step 3501, the copy processing portion 903 and/or 903' registers the encryption key in the key registration field of the row corresponding to the migration destination LDEV number in the LU configuration table 600. When the re-key is not to be executed, the same encryption key as the encryption key corresponding to the migration source LDEV number is registered, and in the case of re-key processing, an encryption key different from the encryption key corresponding to the migration source LDEV number is registered.

If the migration source LDEV is an external LDEV, that is, an LDEV belonging to an external storage subsystem 2 or 2', and there are encryption functions in the external storage subsystem 2 or 2', at this time it is possible that an encryption key for the external LDEV is not registered in the LU configuration table 600 (when an encryption key is not acquired in step 10008 of the LU creation processing of FIG. 9). In this case, in step 3501 the copy processing portion 903' transmits a request to acquire the encryption key for the relevant external LDEV to the external storage subsystem 2 or 2'. In response to this request, the external storage subsystem 2 or 2' acquires the encryption key associated with the relevant external LDEV from the LU configuration table which it manages itself, and transmits the acquired encryption key to the storage subsystem 1. The copy processing portion 903' of the storage subsystem 1 receives the encryption key from the storage subsystem 2 or 2', registers the received encryption key in the key registration field of the row corresponding to the migration source LDEV number in the LU configuration table 600, and then registers the same encryption key in the key registration field of the row corresponding to the migration destination LDEV number.

In steps 3502 and 3503, the copy processing portion 903 and/or 903' judges whether the migration destination LDEV is an external LDEV, and whether the external storage subsystem 2, 2' having the external LDEV has encryption functions. If the migration destination LDEV is not an external LDEV, or if the migration destination LDEV is an external LDEV but the external storage subsystem 2, 2' of the external LDEV does not have encryption functions, then this processing ends. If the migration destination LDEV is an external LDEV and moreover the external storage subsystem 2, 2' having the relevant external LDEV has encryption functions, processing proceeds to step 3504.

In step 3504, the copy processing portion 903 and/or 903' issues an instruction to set the encryption key for the relevant external LDEV to the external storage subsystem 2, 2' of the relevant external LDEV. As the method used to issue an instruction to set the encryption key in the external storage subsystem 2, 2', for example, a method of sending an instruction from the external adapter 12 via the fibre channel cable to the external storage subsystem 2 or 2', or a method of sending an instruction to each of the management terminals 7 or 7' of the external storage subsystem 2 or 2' via the management terminal 6, may be used. In response to this instruction, in the external storage subsystem 2 or 2', the encryption key corresponding to the external LDEV is for example registered in the LU management table for the external storage subsystem 2, 2'.

Figure 19:
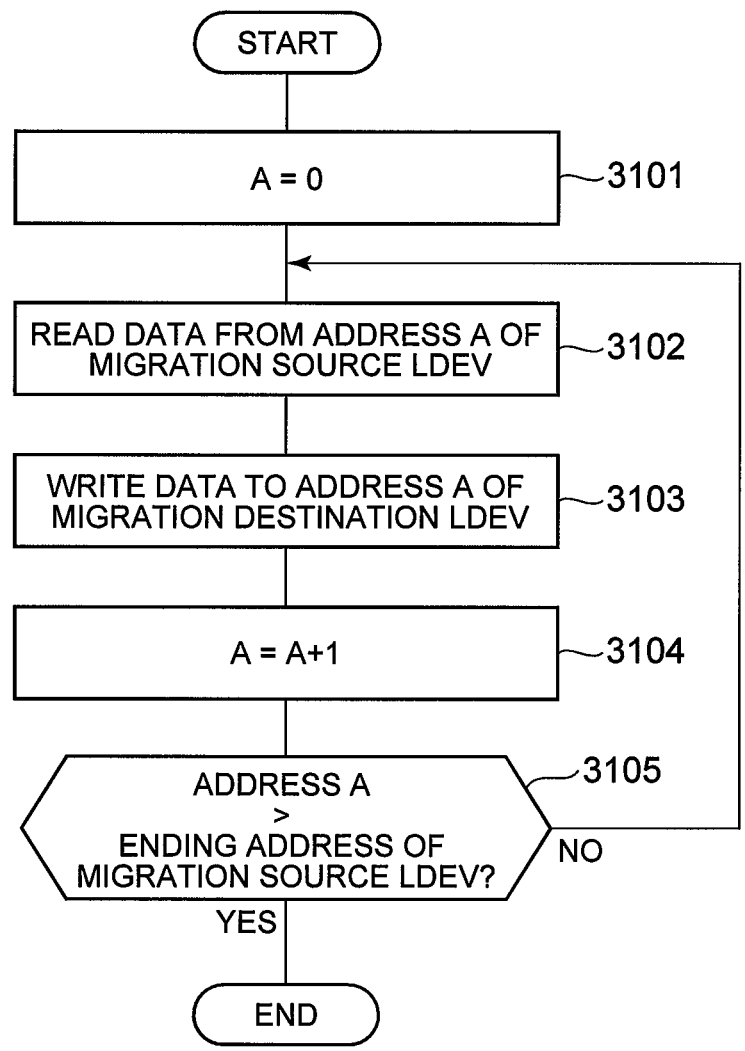
FIG. 19 shows the flow of processing to copy data from a migration source LDEV to a migration destination LDEV, in step 3004 of FIG. 16.

FIG. 19 shows the flow of processing to copy data from the migration source LDEV to the migration destination LDEV in step 3004 of FIG. 17. In this processing, copying is performed in order, from the data at the head address of the migration source LDEV to the data at the ending address, to the migration destination LDEV.

First, the copy processing portion 903 and/or 903' records the counter for control to copy data in order in the cache/control memory 14. In this processing, the counter is denoted by "A".

In step 3101, the copy processing portion 903 and/or 903' sets the counter A to 0. In step 3102, the copy processing portion 903 and/or 903' reads data from address A (the address with the same value as counter A) in the migration source LDEV. Processing to read data from the migration source LDEV can be done by using the same processing as explained referring to FIG. 11 through FIG. 16. In step 3103, the copy processing portion 903 and/or 903' writes the data read at step 3102 to address A in the migration destination LDEV. The specific processing can, similarly to step 3102, be the processing explained referring to FIG. 11 through FIG. 16.

In step 3104, the copy processing portion 903 and/or 903' increments the counter A by 1, and in step 3105, the counter A is referred to, and a judgment is made as to whether the counter A has exceeded the ending address of the migration source LDEV. If the counter A has exceeded the ending address of the migration source LDEV, it means all the data has been copied to the migration destination LDEV, therefore the copy processing portion 903 and/or 903' terminates. Otherwise, processing returns to step 3102, and the copy processing is repeated.

In the processing explained in FIG. 19, an example is shown in which the counter A is incremented by 1 each time, that is, data copying is performed on a block-by-block (sector-by-sector) basis; but it is possible to adopt a method to copy data on more than block-by-block basis, such as for example track-by-track or cylinder-by-cylinder basis, or to copy a fixed continuous area (such as 1 MB) of data at a time.

The migration/re-key processing explained referring to FIG. 17 through FIG. 19 can be executed while receiving I/O requests for the migration source LDEV from a host 4.

Figure 20:
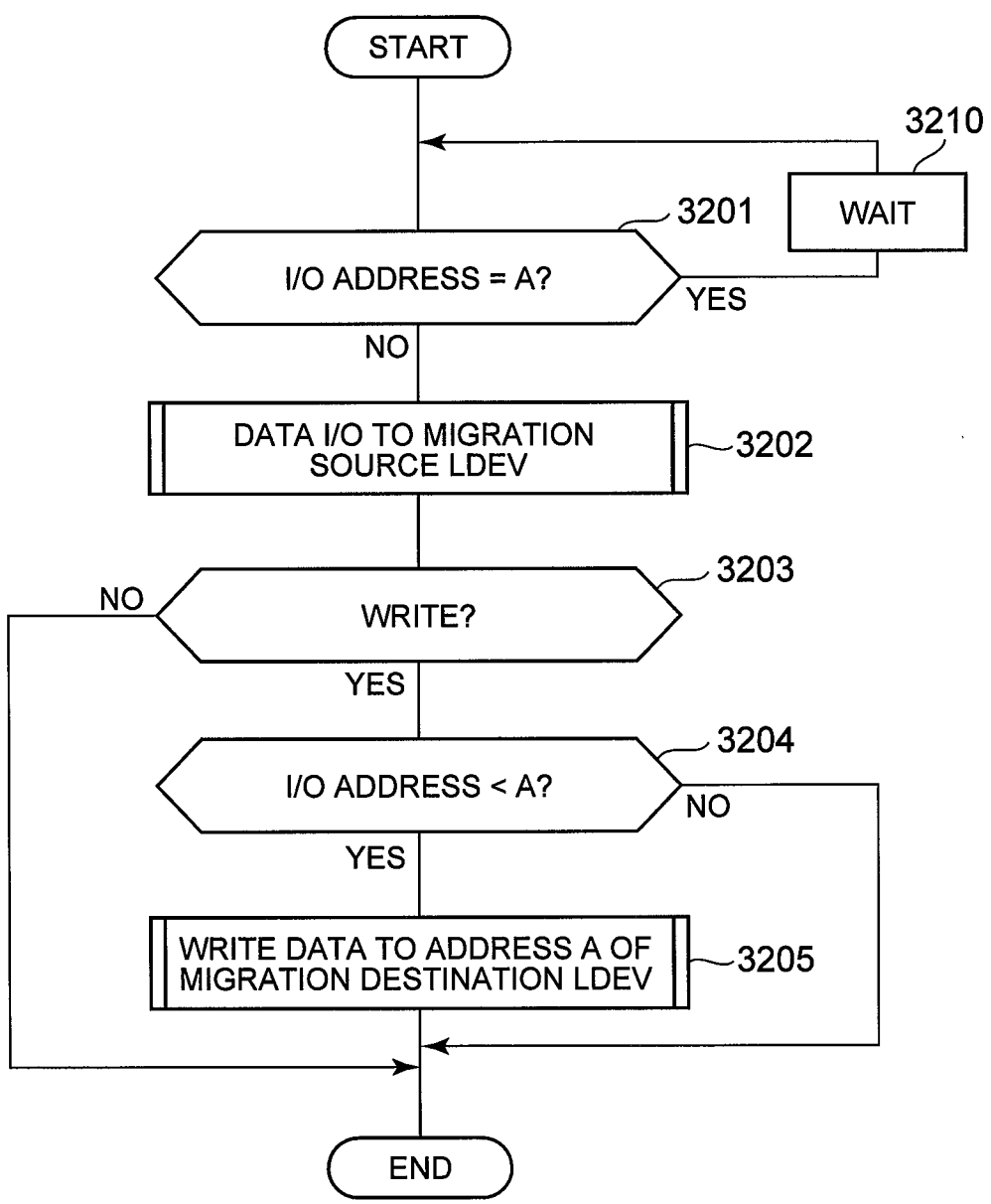
FIG. 20 shows the flow of processing in a storage subsystem which has received an I/O request from a host during execution of migration/re-key processing.

FIG. 20 shows the flow of processing when an I/O request is received from a host 4 during execution of migration/re-key processing. This processing replaces the processing shown in the above-described FIG. 11; when there is an I/O request for a migration source LDEV during execution of migration/re-key processing, the processing of FIG. 20 is executed in place of that of FIG. 11.

In step 3201, the command processing portion 901 compares the address designated by the received I/O request with the counter A being used in the copy processing of FIG. 19, and judges whether the address designated by the I/O request and the counter A are equal. If they are equal, processing waits for a certain period of time (for example one millisecond or similar) and then returns to step 3201.

In step 3202, the command processing portion 901 performs I/O processing of the migration source LDEV, that is, read or write processing. In this step, the processing described in FIG. 11 is performed.

In step 3203, the command processing portion 901 judges whether the I/O request is a write request. If the request is a write request, processing proceeds to step 3204; if not, that is, if the request is a read request, processing ends.

In step 3204, the command processing portion 901 judges whether the address designated by the received I/O request is smaller than the counter A. If the address is larger than the counter A, since the data which is written at this address in the migration source LDEV at step 3202 will soon be copied to the migration destination LDEV in the copy processing of FIG. 18, the processing may be ended without doing anything. However, if the address designated in the I/O request is smaller than the counter A, as the data at this address has already been copied in the copy processing of FIG. 19, it will not be copied again. Hence the data written in this processing must be copied to the migration destination LDEV, and so in step 3205 the command processing portion 901 calls the external I/O processing portion 902' as necessary, and causes writing of write data to address A of the migration destination LDEV. In order to perform this write processing, similarly to step 3202, the processing described in FIG. 11 is executed.

The above is an explanation of the first embodiment.

In this first embodiment, at least one among the external storage subsystems 2, 2' may be configured similarly to storage subsystem 1. Further, the encryption processing portion 134 may be provided in the HDDs 16, in place of or in addition to the DKA 13. In this case, in step 2002 of FIG. 14 and step 2102 of FIG. 15, the destination for passing encryption keys and the destination for instructions is the encryption processing portion in the HDDs 16.

<Second Embodiment>

Below, a second embodiment of the invention is explained. The configuration of the computer system in the second embodiment is substantially the same as in the first embodiment. However, there are some differences in the functions and the information managed in the storage subsystem 1, and the following explanation mainly describes these differences.

FIG. 21 shows an example of an EDEV information table 250' managed by the storage subsystem 1 in the second embodiment.

A difference with the EDEV information table 250 of the first embodiment is the addition of flag information in a column 256. A value in this field of "1" means that the external storage subsystem (2 or 2') of the relevant EDEV comprises functions for reading encrypted data (ciphertext) as-is, and functions for storing data received from storage subsystem 1 (for example, ciphertext) without performing any operations (without performing encryption or decryption) in an external LDEV of the external storage subsystem. On the other hand, a value of "0" means that the external storage subsystem (2 or 2') of the relevant EDEV does not comprise such functions. These functions are described below.

The user inputs information to column 256 for storage subsystem 1 via the management terminal 6. That is, the user judges whether the external storage subsystem 2 or 2' connected to storage subsystem 1 has the functions in question, and if the functions are present, inputs 1 into column 256. As another method, the storage subsystem 1 acquires information on the presence or absence of the functions in the external storage subsystem 2 or 2' via the management terminals 6, 7, 7' or via the I/F 123, and reflects this result in the column 256.

In the volume migration processing of the first embodiment, when the data of the migration source LDEV is read into the cache region, the data is always decrypted into plaintext before storage in the cache region, and is encrypted when writing to the migration destination LDEV. However, in the second embodiment, in volume migration processing in which encryption key modification (re-keying) does not occur, the ciphertext of the migration source LDEV is copied as-is, without decryption, to the migration destination LDEV.

Figure 22:
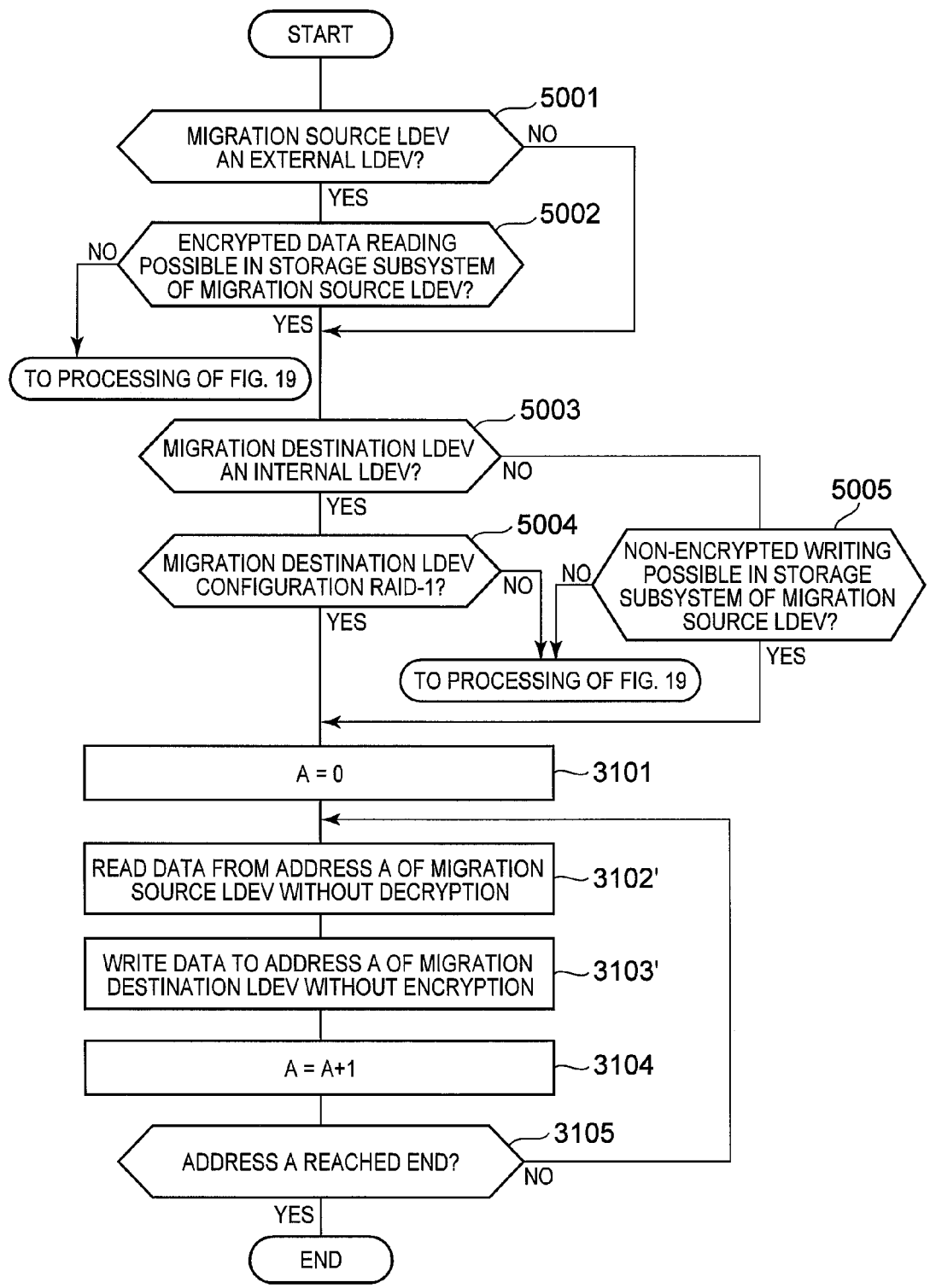
FIG. 22 shows the flow of processing to copy data from a migration source LDEV to a migration destination LDEV in the second embodiment; and, FIG. 23 shows the flow of processing of an I/O request to an external LDEV, in the case of data reading from an external LDEV and data writing to an external LDEV, in processing to copy data from the migration source LDEV to the migration destination LDEV of FIG. 22.

FIG. 22 shows the flow of processing to copy data from the migration source LDEV to the migration destination LDEV in step 3004 of FIG. 17. Because this processing has much in common with the copy processing of FIG. 19 in the first embodiment, the explanation primarily addresses the differences.

Prior to reading of data from the migration source LDEV (steps 3101 and beyond), a judgment is made as to whether copying using this processing is possible. First, in step 5001 the copy processing portion 903 and/or 903' judges whether the migration source LDEV is an external LDEV. If the LDEV is an external LDEV, processing proceeds to step 5002, and otherwise processing proceeds to step 5003.

In step 5002, the copy processing portion 903 and/or 903' judges whether it is possible to read data (ciphertext) in the un-decrypted state (while remaining encrypted) from the storage subsystem 2, 2' of the migration source LDEV. If it is judged that reading data in the un-decrypted state is not possible, the processing of step 3101 and beyond in FIG. 19 is performed.

Next, in step 5003 and beyond, judgment of conditions relating to the migration destination LDEV is performed.

Specifically, in step 5003 the copy processing portion 903 and/or 903' judges whether the migration destination LDEV is an internal LDEV. If the LDEV is an internal LDEV, processing proceeds to step 5004, and a judgment is made as to whether the RAID configuration of the migration destination LDEV is RAID-5 or another RAID configuration in which parity is created. In the case of RAID-5 or another configuration in which parity is created, the processing of FIG. 22 is not used, and migration processing is performed using the processing of FIG. 19.

When in step 5003 it is judged that the migration destination LDEV is an external LDEV, processing proceeds to step 5005, and the copy processing portion 903 and/or 903' judges whether the external storage subsystem 2, 2' of the migration destination LDEV can write ciphertext as-is. If such write operation is possible, processing proceeds to step 3101, and if not possible, the processing of step 3001 and beyond in FIG. 19 is performed.

The processing of step 3101 and beyond in FIG. 22 is nearly the same as the processing of step 3101 and beyond in FIG. 19. In FIG. 22, in place of step 3102 of FIG. 19, step 3102' is performed, and the copy processing portion 903 and/or 903' performs reading without decryption when reading data from the migration source LDEV. As a result, the data read from the migration source LDEV is ciphertext. And, step 3103 of FIG. 19 is changed to step 3103', and during data writing to the migration destination LDEV, the copy processing portion 903 and/or 903' performs writing of the ciphertext read in step 3102' without performing encryption.

The judgments of step 5002 or step 5005 are performed based on the value in column 256 in the EDEV information table 250' of FIG. 21. If the value in column 256 is 1, then data can be read in the un-decrypted state (as encrypted) from a storage subsystem where the migration source LDEV resides, and the encrypted data can be written as-is to a storage subsystem in the migration destination LDEV.

In the processing of step 5004, the reason for changing the processing according to the RAID configuration of the migration destination LDEV is that, if parity is generated based on the ciphertext in the storage subsystem 1, then the generated value is different from the parity which should originally be generated. In the storage subsystem 1, encryption processing is performed immediately before writing to the HDDs 16, so that normally parity is generated based on plaintext and encryption of the parity is performed immediately before storage on the HDDs 16. That is, the parity written to the HDDs 16 is the result of encryption of parity generated from plaintext. However, if the ciphertext is in the cache region as in the processing of FIG. 22, then the parity is generated based on the ciphertext, and will differ from the parity generated from plaintext; for this reason, when the migration destination LDEV is an internal LDEV, the case when steps 3101 and beyond in FIG. 22 can be executed is limited only to the cases when the RAID configurations of the migration destination LDEV are in the one whose parity is not generated (RAID 0, 1, 0+1, and similar). However, in cases in which the position of the encryption processing portion in the storage subsystem 1 is not in the DKA 13, such as for example when the encryption processing portion is in the CHA 11, and encryption processing is executed when data from a host is stored in the cache region, such a constraint is unnecessary, and the judgment processing in step 5004 need not be performed.

Steps 3102' and 3103' are as a rule performed by executing processing substantially the same as the LDEV I/O processing of FIG. 11 through FIG. 16. However, in step 3102' the data which has been encrypted and stored in the LDEV (ciphertext) is read without being decrypted, and in step 3103' the data read in step 3102' is transmitted to the HDDs 16 or external storage subsystem 2 or 2' without encryption by the storage subsystem 1, so that the processing differs somewhat from that of FIG. 14 through FIG. 16.

In the read processing of step 3102', when data is being read from an internal LDEV, steps 2101 and 2102 in FIG. 15 are not performed, and the data is read from the HDDs 16 to the cache region.

Figure 23:
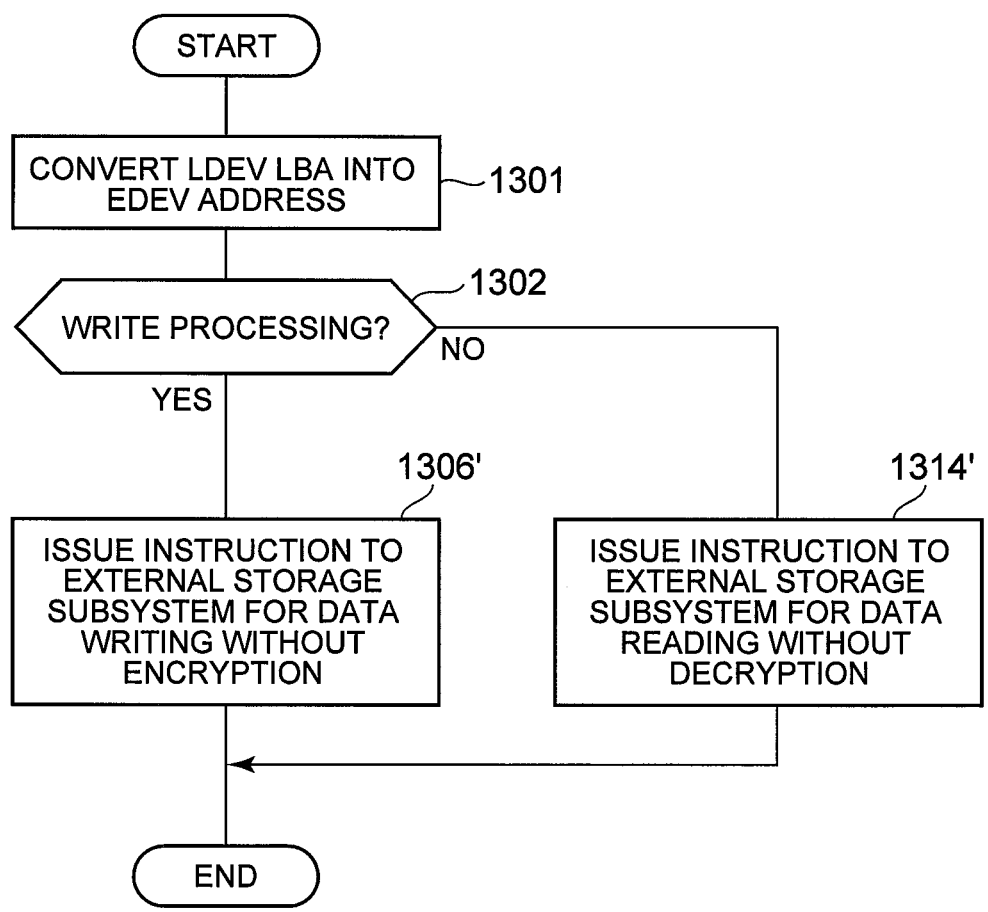

The flow of I/O processing for an external LDEV is shown in FIG. 23. This processing is similar to that of FIG. 16, but steps 1303, 1304, 1305, 1311, 1312, 1313 in FIG. 16 are absent.

Also in FIG. 23, step 1306 in FIG. 16 is modified to step 1306', in which when a write request is sent out to the external storage subsystem 2 or 2', a request to instruct writing without encrypting the write data (hereafter called a "no-encryption write request") is transmitted.

Also in FIG. 23, step 1314 in FIG. 16 is modified to step 1314', in which when a read request is sent to the external storage subsystem 2, 2', for example, a request to read un-decrypted data (ciphertext) as-is (hereafter called a "no-decryption read request") is transmitted.

In order to read data which has not been decrypted (ciphertext), or in order to write data (ciphertext) without performing encryption in an external storage subsystem 2, 2', for example, the external storage subsystem 2, or 2' must comprise functions to receive a no-encryption write request or a no-decryption read request from the storage subsystem 1, and to return data which has not been decrypted, or to store data without performing encryption processing. One specific method is for example a method in which, rather than a READ/WRITE command stipulated by the SCSI-FCP protocol, a newly-defined special command is issued from the storage subsystem 1 to the external storage subsystem 2 or 2'.

Further, as a method of for example reading data which has not been decrypted (ciphertext), or of writing data (ciphertext) without encryption in an external storage subsystem 2, 2', the external I/O processing portion 902' may notify the external storage subsystem 2, 2' that the external LDEV which is the access destination is not an LDEV for encryption. Upon receiving this notification, the external storage subsystem 2, 2' may for example select NO in step 2001, or may select NO in step 2101, in the processing of FIG. 14 or FIG. 15 in the external storage subsystem 2, 2'.

The above is an explanation of the second embodiment.

In this second embodiment, at least one among the external storage subsystems 2, 2' may be configured similarly to the storage subsystem 1. For example, in the external storage subsystems 2, 2', if the command processing portion has received a no-encryption write request the write data of which is ciphertext, a write request to write the ciphertext to the external LDEV designated by the no-encryption write request is sent to the disk I/O processing portion. In this write request, for example, encryption-exclusion information indicating that the external LDEV is not to be encrypted is set. The disk I/O processing portion receives the write request from the command processing portion, and if encryption-exclusion information is set in the write request, then the ciphertext of the write request is transferred as-is to the HDDs (the HDDs comprised by the external LDEV). And when for example the command processing portion in an external storage subsystem 2, 2' receives a no-decryption read request to read ciphertext, a read request is sent to the disk I/O processing portion to read the ciphertext from the external LDEV designated by the no-decryption read request. In this read request, for example, encryption-exclusion information indicating that the external LDEV is not to be encrypted is set. The disk I/O portion receives the read request from the command processing portion, and if encryption-exclusion information is set in the read request, reads the ciphertext of the read request as-is from the HDDs (the HDDs comprised by the external LDEV) and transfer the data to the cache region.

<Third Embodiment>

In the third embodiment, data migration from the external storage subsystem 2 to the external storage subsystem 2' is performed without passing through the storage subsystem 1. This data migration can be performed when the encryption key associated with the migration source external LDEV is not changed.

For example, the management terminal 7 transmits to the external storage subsystem 2 a data migration instruction, for data migration of ciphertext as-is from a first external LDEV of the external storage subsystem 2 to a second external LDEV of the external storage subsystem 2'. In response, the external storage subsystem 2 (for example, the command processing portion) transmits to the external storage subsystem 2' a write request designating the second external LDEV and, as the data for writing, the ciphertext of the first external LDEV designated by the data migration instruction.

If there are encryption functions in the external storage subsystem 2', then the management terminal 7 or the external storage subsystem 2 indicates to the storage subsystem 2' that encryption of the data for writing to the second external LDEV is not necessary. By this means, the external storage subsystem 2' writes the ciphertext of the write request from the external storage subsystem 2 to the second external LDEV without performing encryption.

The external storage subsystem 2 or management terminal 7 notifies the storage subsystem 1 or management terminal 6 that the data (ciphertext) within the first external LDEV has been migrated to the second external LDEV. In response to this notification, the storage subsystem 1 or management terminal 6 updates the information corresponding to the first external LDEV in the EDEV information table 250 to information corresponding to the second external LDEV. By this means, upon receiving from a host 4 an I/O request designating the first external LDEV, the storage subsystem 1 can execute I/O for the second external LDEV.

In the above, a number of embodiments of the invention have been explained; but these embodiments are merely examples for the purpose of explaining the invention, and the scope of the invention is not limited by these embodiments. This invention can be implemented in various other modes without deviating from the gist thereof. For example, encryption keys may be in units of sub-regions comprised by LDEVs, or in HDD units, rather than in LDEV units.

What is claimed is:

1. A storage virtualization apparatus coupled to a first external storage subsystem which is a first storage subsystem existing externally, and to a second external storage subsystem which is a second storage subsystem existing externally, comprising:
   a processor;
   a memory;
   a storage virtualization provides to a higher-level device, as its own logical volume, a first external logical volume of the first external storage subsystem;
   an encryption processing encrypts data;
   an encryption key registration registers, in a storage region, an encryption key, which is an electronic key used for encryption of data by the encryption processing;
   a cache region;
   a higher-level interface is an interface with higher-level devices, and which receives data write requests from the higher-level devices;
   an external interface is an interface with external storage subsystems;
   a cache causes data received by the higher-level interface and/or the external interface to be stored in the cache region;
   a judgment processing judges whether there is a first encryption function in the first external storage subsystem having a first external logical volume identified based on the received write request;
   an I/O processing stored in the memory,
   wherein when the I/O processing is executed by the processor, if a result of the first judgment is positive, the processor causes the I/O processing to transmit to the first external storage subsystem via the external interface a write request to write data in the cache region to the first external logical volume, without causing the data to be encrypted by the encryption processing, whereas, if a result of the first judgment is negative, the processor causes the I/O processing to cause the encryption processing to encrypt data in the cache region to generate encrypted data, and to transmit to the first external storage subsystem via the external interface a write request to write the encrypted data to the first external logical volume; and
   a migration processing executes migration processing to migrate data stored on the first external logical volume to the second external logical volume of the second external storage subsystem,
   wherein, in the migration processing, the encryption key registration registers an encryption key used for data encryption in the storage region,
   wherein the judgment processing is configured to perform a second judgment as to whether the second storage subsystem has a second encryption function in the migration processing,
   (A) when a result of the second judgment is positive,
   (a1) if the first external storage subsystem has the first encryption function, the migration processing is configured to receive, from the first external storage subsystem, data obtained by what the first encryption function decrypts encrypted data stored on the first external logical volume, in contrast, if the first external storage subsystem does not have the first encryption function, the migration processing is configured to receive, from the first external storage subsystem, encrypted data stored on the first external logical volume and cause the encryption processing to use an encryption key stored in the storage region to decrypt the encrypted data,
   (a2) the migration processing is configured to transmit an encryption key of the storage region to the second external storage subsystem, and transmit, without causing the encryption processing to perform encryption, to the second external storage subsystem, the data which is decryption data obtained in (a1), thereby causing the second encryption function to encrypt the decrypted data by using the transmitted encryption key,
   (B) when a result of the second judgment is negative,
   (b1) if the first external storage subsystem has the first encryption function, the migration processing is configured to receive, from the first external storage subsystem, data obtained by what the first encryption function decrypts encrypted data stored on the first external logical volume, in contrast, if the first external storage subsystem does not have the first encryption function, the migration processing is configured to receive, from the first external storage subsystem, encrypted data stored on the first external logical volume, and cause the encryption processing to use an encryption key stored in the storage region to decrypt the encrypted data, (b2) the migration processing is configured to cause the encryption processing to encrypt data which is decryption data obtained in the above (b1), by using an encryption key of the storage region, and transmit encrypted data obtained by the encryption to the second external storage subsystem, and the storage virtualization, at least after completing the migration processing, is configured to provide the second external logical volume to a higher-level device as its own logical volume.

2. A storage virtualization apparatus according to claim 1, wherein after encrypted data stored in the first external logical volume has been migrated to the second external logical volume by the migration processing, the higher-level interface is configured to receive a read request designating the second external logical volume, wherein the judgment processing is configured to judge, as the first judgment, whether a second encryption function exists in the second external storage subsystem having the second external logical volume identified based on the received read request, and when there is no second encryption function in the second external storage subsystem, the I/O processing, in response to the read request, is configured to transmit to the second external storage subsystem a read request to read encrypted data from the second external logical volume, and after the external interface has received the encrypted data read from the second external logical volume and the cache has stored the encrypted data in the cache region, the I/O processing is configured to cause the encryption processing to use an encryption key registered in the storage region to decrypt the encrypted data in the cache region, and transmit the data obtained by the decryption to the higher-level device via the higher-level interface.

3. A storage virtualization apparatus according to claim 1, wherein after encrypted data stored on the first external logical volume has been migrated to the second external logical volume by the migration processing, the higher-level interface is configured to receive a write request designating the second external logical volume, wherein the judgment processing is configured to judge, as the first judgment, whether a second encryption function exists in the second external storage subsystem of the second external logical volume identified based on the received write request, and when the result of the first judgment is negative, the I/O processing is configured to cause the encryption processing to execute encryption of data in the cache region using an encryption key registered in the storage region, and transmit to the second external storage subsystem via the external interface a write request to write encrypted data obtained by the encryption to the second external logical volume.

4. A storage virtualization apparatus according to claim 1, further comprising:

an encryption key re-key modifies, periodically or irregularly, an encryption key stored in the storage region, wherein the migration processing is configured to perform the migration processing at the moment of changing an encryption key stored in the storage region.

5. A storage virtualization apparatus according to claim 1, wherein the higher-level interface is configured to receive a data read request from the higher-level device, wherein the judgment processing is configured to perform a first judgment as to whether a first encryption function is present in the first external storage subsystem having the first external logical volume identified based on the received read request, and the I/O processing, in response to the read request, is configured to transmit to the first external storage subsystem a read request to read data from the first external logical volume, and after the external interface receives data from the first external storage subsystem and causes the data to be stored in the cache region by the cache, and when the result of the first judgment is positive, is configured to transmit the data in the cache region as-is to the higher-level device via the higher-level interface, whereas when the result of the first judgment is negative, cause the encryption processing to decrypt the encrypted data in the cache region, and transmit the data obtained by the decryption to the higher-level device via the higher-level interface.

6. A storage system, comprising:

a storage virtualization apparatus;

a first external storage subsystem having a first external logical volume, and a second external storage subsystem having a second external logical volume, wherein the storage virtualization apparatus comprises:

a processor;

a memory;

a storage virtualization provides to a higher-level device, as its own logical volume, the first external logical volume;

an encryption processing encrypts data;

an encryption key registration registers, in a storage region, an encryption key, which is an electronic key used for encryption of data by the encryption processing;

a cache region;

a higher-level interface is an interface with higher-level devices, and which receives data write requests from the higher-level devices;

an external interface is an interface with external storage subsystems;

a cache causes data received by the higher-level interface and/or the external interface to be stored in the cache region;

a judgment processing performs a first judgment as to whether there is a first encryption function in the first external storage subsystem having the first external logical volume identified based on the received write request;

an I/O processing stored in the memory, wherein when the I/O processing is executed by the processor, and when the result of the first judgment is positive, the processor causes the I/O processing to transmit to the first external storage subsystem via the external interface a write request to write data in the cache region to the first external logical volume, without causing the data to be encrypted by the encryption processing, whereas when the result of the first judgment is negative, the processor causes the I/O processing cause the encryption processing to encrypt data in the cache region to generate encrypted data, and to transmit to the first external storage subsystem via the external interface a write request to write the encrypted data to the first external logical volume; and a migration processing executes migration processing to migrate data stored on the first external logical volume to the second external logical volume of the second external storage subsystem, wherein, in the migration processing, the encryption key registration registers an encryption key used for data encryption in the storage region, wherein the judgment processing is configured to perform a second judgment as to whether the second storage subsystem has a second encryption function in the migration processing, (A) when a result of the second judgment is positive, (a1) if the first external storage subsystem has the first encryption function, the migration processing is configured to receive, from the first external storage, subsystem, data obtained by what the first encryption function decrypts encrypted data stored on the first external logical volume, in contrast, if the first external storage subsystem does not have the first encryption function, the migration processing is configured to receive, from the first external storage subsystem, encrypted data stored on the first external logical volume and cause the encryption processing to use an encryption key stored in the storage region to decrypt the encrypted data, (a2) the migration processing is configured to transmit an encryption key of the storage region to the second external storage subsystem, and transmit, without causing the encryption processing to perform encryption, to the second external storage subsystem, the data which is decryption data obtained in (a1), thereby causing the second encryption function to encrypt the decrypted data by using the transmitted encryption key, (B) when a result of the second judgment is negative, (b1) if the first external storage subsystem has the first encryption function, the migration processing is configured to receive, from the first external storage subsystem, data obtained by what the first encryption function decrypts encrypted data stored on the first external logical volume, in contrast, if the first external storage subsystem does not have the first encryption function, the migration processing is configured to receive, from the first external storage subsystem, encrypted data stored on the first external logical volume, and cause the encryption processing to use an encryption key stored in the storage region to decrypt the encrypted data, (b2) the migration processing is configured to cause the encryption processing to encrypt data which is decryption data obtained in (b1), by using an encryption key of the storage region, and transmit encrypted data obtained by the encryption to the second external storage subsystem, and the storage virtualization, at least after completing the migration processing, is configured to provide the second external logical volume to a higher-level device as its own logical volume.

7. A storage control method of a storage virtualization apparatus connected to a first external storage subsystem which is a first storage subsystem existing externally, and to a second external storage subsystem which is a second storage subsystem existing externally, comprising the steps of:

storing, in a cache region, data according to a write request received from the higher-level device by the storage virtualization apparatus;

performing a first judgment of judging whether a first encryption function is present in the first external storage subsystem of the first external logical volume identified based on the received write request;

if a result of the first judgment is positive, transmitting the data in the cache region, without performing encryption by an encryption function of the storage virtualization apparatus, from the storage virtualization apparatus to the first external storage subsystem; and if the result of the first judgment is negative, encrypting, the data in the cache region using an encryption function of the storage virtualization apparatus, and transmitting the encrypted data obtained by the encryption from the storage virtualization apparatus to the first external storage subsystem, when performing migration processing for migrating data stored in the first external logical volume to the second external logical volume, registering an encryption key used for data encryption by a first encryption function, performing a second judgment as to whether the second storage subsystem has a second encryption function, (A) when a result of the second judgment is positive, (a1) if the first external storage subsystem has the first encryption function, receiving, from the first external storage subsystem, data obtained by what the first encryption function decrypts encrypted data stored on the first external logical volume, in contrast, if the first external storage subsystem does not have the first encryption function, receiving, from the first external storage subsystem, encrypted data stored on the first external logical volume and causing the encryption processing to use an encryption key stored in the storage region to decrypt the encrypted data, (a2) transmitting an encryption key of the storage region to the second external storage subsystem, and transmitting without causing the encryption processing to perform encryption, to the second external storage subsystem, the data which is decryption data obtained in (a1), thereby causing the second encryption function to encrypt the decrypted data by using the transmitted encryption key, (B) when a result of the second judgment is negative, (b1) if the first external storage subsystem has the first encryption function, receiving, from the first external storage subsystem, data obtained by what the first encryption unction decrypts encrypted data stored on the first external logical volume, in contrast, if the first external storage subsystem does not have the first encryption function, receiving, from the first external storage subsystem, encrypted data stored on the first external logical volume, and causing the encryption processing to use an encryption key stored in the storage region to decrypt the encrypted data, (b2) causing the processing data which is decryption data obtained in (b1), by using an encryption key of the storage region, and transmitting encrypted data obtained by the encryption to the second external storage subsystem, and at least after completing the migration processing, providing the second external logical volume to a higher-level device as its own logical volume.

* * * * *